(12) United States Patent
Ashida et al.

(10) Patent No.: US 9,688,068 B2
(45) Date of Patent: Jun. 27, 2017

(54) REAL-TIME LINEFEED MEASUREMENT OF INKJET PRINTER

(71) Applicant: CANON KABUSHIKI KAISHA, Tokyo (JP)

(72) Inventors: Jumpei Ashida, Artarmon (AU); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 13/722,212

(22) Filed: Dec. 20, 2012

(65) Prior Publication Data

US 2013/0162710 A1 Jun. 27, 2013

(30) Foreign Application Priority Data

Dec. 21, 2011 (AU) ................................ 2011265415

(51) Int. Cl.
| | |
|---|---|
| B41J 29/393 | (2006.01) |
| B41J 2/12 | (2006.01) |
| B41J 2/125 | (2006.01) |
| B41J 2/165 | (2006.01) |
| B41J 2/21 | (2006.01) |
| B41J 11/42 | (2006.01) |
| B41J 19/20 | (2006.01) |
| H04N 1/047 | (2006.01) |

(Continued)

(52) U.S. Cl.
CPC ................ *B41J 2/12* (2013.01); *B41J 2/125* (2013.01); *B41J 2/16517* (2013.01); *B41J 2/2132* (2013.01); *B41J 2/2142* (2013.01); *B41J 11/425* (2013.01); *B41J 19/202* (2013.01); *H04N 1/0473* (2013.01); *H04N 1/12* (2013.01); *H04N 1/1911* (2013.01); *H04N 2201/0471* (2013.01); *H04N 2201/04756* (2013.01)

(58) Field of Classification Search
USPC .......................................................... 347/19
See application file for complete search history.

(56) References Cited

U.S. PATENT DOCUMENTS

| | | | |
|---|---|---|---|
| 6,547,362 B2 * | 4/2003 | Subirada | ................ B41J 2/2132 347/14 |
| 6,568,787 B1 | 5/2003 | Girones | |

(Continued)

FOREIGN PATENT DOCUMENTS

| | | |
|---|---|---|
| AU | 2008264167 A1 | 7/2010 |
| EP | 1391309 B1 | 11/2005 |
| NL | WO 2010054963 A1 * | 5/2010 ............ B41J 2/2128 |

*Primary Examiner* — Matthew Luu
*Assistant Examiner* — Lily Kemathe
(74) *Attorney, Agent, or Firm* — Canon U.S.A., Inc. IP Division

(57) ABSTRACT

Disclosed is a method of determining line feed error in an image forming apparatus for printing an image, said image forming apparatus comprising a print head having a head sensor configured to sense information from the image printed on a print medium, said method comprising the steps of printing a first swath of the image on the print medium, repositioning the print head relative to the print medium by at least one line feed distance, determining a line feed error based upon information sensed from the printed first swath by the head sensor, and printing, using the determined line feed error, a second swath of the halftone image on the print medium.

6 Claims, 20 Drawing Sheets

(51) Int. Cl.
*H04N 1/12* (2006.01)
*H04N 1/191* (2006.01)

(56) References Cited

U.S. PATENT DOCUMENTS

| | | | | |
|---|---|---|---|---|
| 7,055,925 | B2 * | 6/2006 | Subirada | H04N 1/23 347/19 |
| 7,431,522 | B2 * | 10/2008 | Linville | B41J 11/0065 347/19 |
| 8,059,318 | B2 * | 11/2011 | Maebashi et al. | 358/504 |
| 8,651,610 | B2 * | 2/2014 | Sethne | 347/16 |
| 8,894,174 | B2 * | 11/2014 | Sethne | B41J 2/2132 347/14 |
| 2002/0130914 | A1 * | 9/2002 | Mantell | B41J 2/04505 347/15 |
| 2003/0058295 | A1 | 3/2003 | Heiles | |
| 2005/0093900 | A1 * | 5/2005 | King | B41J 29/393 347/9 |
| 2009/0268254 | A1 * | 10/2009 | Morishita et al. | 358/3.09 |
| 2010/0156987 | A1 * | 6/2010 | Yip | B41J 29/393 347/19 |
| 2010/0208304 | A1 * | 8/2010 | Murase | 358/3.26 |
| 2012/0212535 | A1 * | 8/2012 | Sethne | B41J 2/04505 347/16 |

* cited by examiner

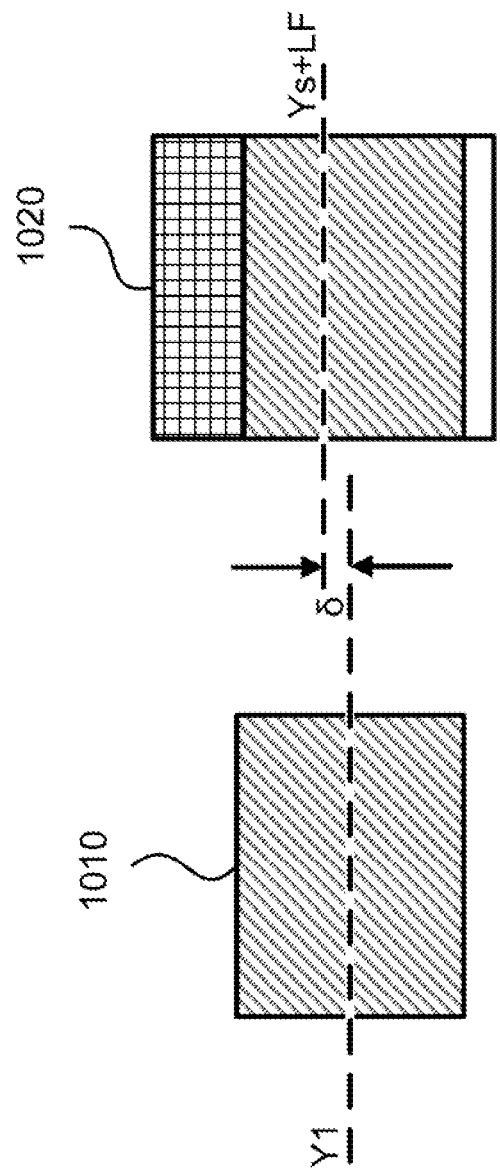

REAL-TIME LINEFEED MEASUREMENT OF INKJET PRINTER

REFERENCE TO RELATED PATENT APPLICATION(S)

This application claims the benefit under 35 U.S.C. §119 of the filing date of Australian Patent Application No. 2011265415, filed 21 Dec. 2011, hereby incorporated by reference in its entirety as if fully set forth herein.

FIELD OF THE INVENTION

The current invention relates generally to printer calibration and, in particular, to a method including real time analysis of images printed by a printer in order to determine spatial characteristics of the printer.

BACKGROUND

In recent years high quality colour printers have become the norm. For ink jet printers, typical resolutions are 1200 dpi or higher, which translates into a printer ink dot size (and separation) of 20 microns or less. In many systems the ink jet printer may overprint regions multiple times to help minimise the effect of printer defects such as blocked printer head nozzles. The optical density of a printed colour can be very sensitive to the precise value of the displacement between overprinted regions. This means that (for high quality at least) it is necessary to control or calibrate the exact displacement of the printer head between overprints.

Many approaches have been proposed for calibrating the movements of the print head relative to the medium being printed upon. One approach to the calibration of print head position is the measurement of individual dot positions. Unfortunately, despite the simple experimental set-up and straightforward result analysis of this approach, it is quite unreliable due to the large variations in dot shape, position and size. There is also the difficulty of unambiguously locating isolated dots in large regions on the medium being printed upon.

More robust methods have also been suggested to accommodate the noise and ambiguity in order to achieve accurate measurement of print head position. Some methods measure the position of a print head by printing specially designed test charts and scanning the printed image later to find the relative shift of each overprint using Fourier analysis. Although these methods are robust to noise, they involve complex computation and are not performed in real-time due to the separate printing and scanning processes that are involved.

Other methods include a positioning method described in U.S. Pat. No. 6,568,787 where an optical sensor is used to accurately position the print head in the capping area of the service station. However, to determine the position of the sensor relative to the print head, a separate measurement has to take place beforehand through printing and scanning a specially designed test chart.

Other methods include a method described in US 2009/0268254 where an optical sensor is used to measure and correct print density error. However, the printing area to be corrected needs to be covered by the field of view of the sensor. Therefore, this method can be costly and require a considerable amount of computational power. Moreover, some print defects caused by linefeed error cannot be corrected in this way.

SUMMARY

It is an object of the present invention to substantially overcome, or at least ameliorate, one or more disadvantages of existing arrangements.

Disclosed are arrangements, referred to as Relative Shift Measurement (RSM) arrangements, that seek to address the above problems by using a print head sensor to measure, in real-time during printing, the relative shift (displacement) between a reference image to be printed and the image actually printed, in order to thereby determine error between a nominal design line feed distance and the actual line feed distance. The technique is also used to compensate for slight variations of the print head sensor relative to the print head which may arise during printing due to thermal and other effects.

According to a first aspect of the present invention, there is provided a method of determining line feed error in an image forming apparatus for printing an image, said image forming apparatus comprising a print head having a head sensor configured to sense information from the image printed on a print medium, said method comprising the steps of:

printing a first swath of the image on the print medium;
repositioning the print head relative to the print medium by at least one line feed distance;
determining a line feed error based upon information sensed from the printed first swath by the head sensor; and
printing, using the determined line feed error, a second swath of the image on the print medium.

According to another aspect of the present invention, there is provided an apparatus for implementing any one of the aforementioned methods.

According to another aspect of the present invention there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the present invention will now be described with reference to the drawings, in which:

FIGS. 10A and 10B illustrate the relative positions of different sections of the print head and the printed swaths;

DETAILED DESCRIPTION

Figure 1A:
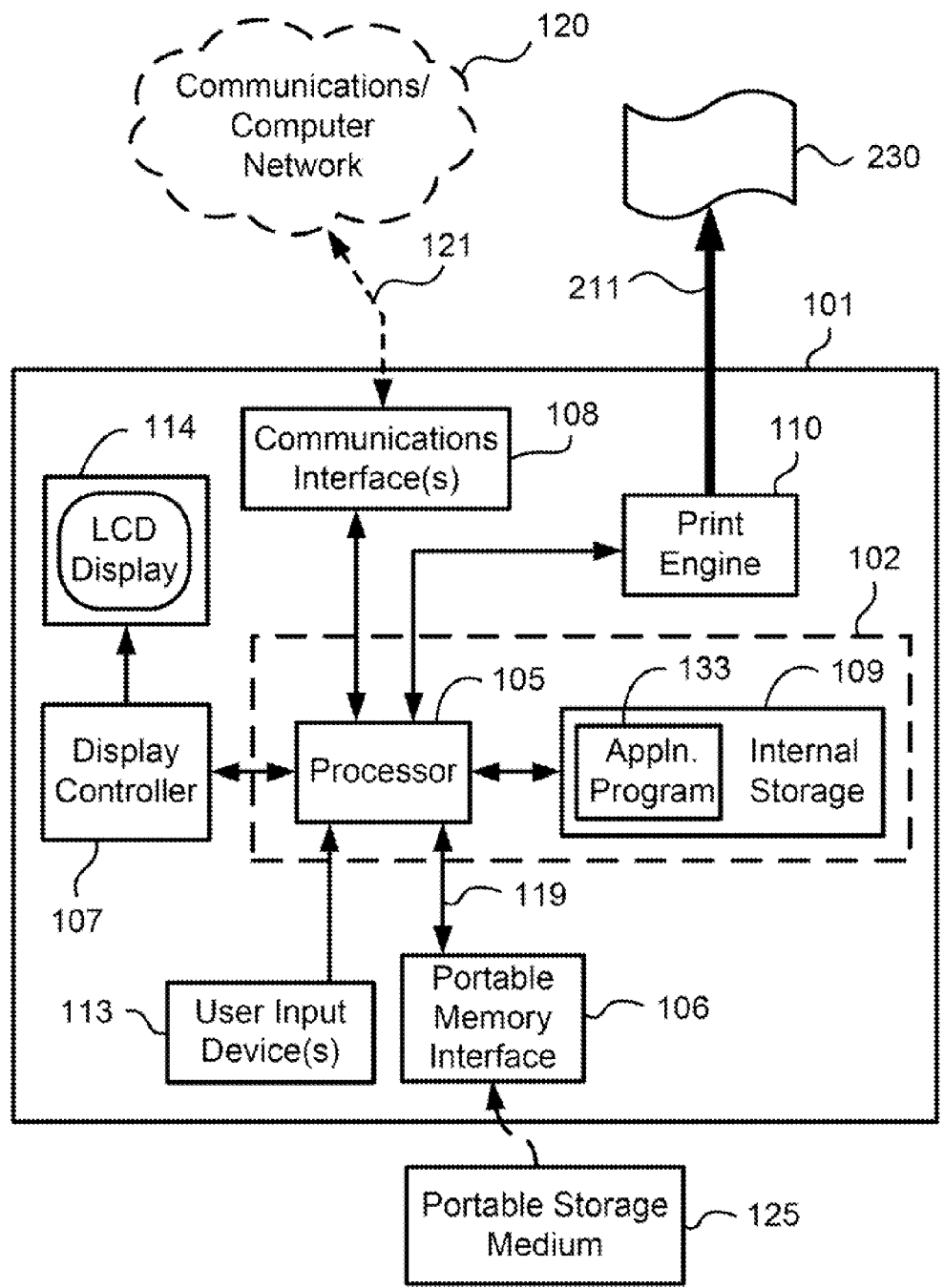
FIGS. 1A and 1B collectively form a functional block diagram representation of a printer upon which described RSM arrangements can be practised.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section relating to prior art arrangements relate to discussions of documents or devices which may form public knowledge through their respective publication and/or use. Such discussions should not be interpreted as a representation by the present inventor(s) or the patent applicant that such documents or devices in any way form part of the common general knowledge in the art.

[Processing Environment]

Figure 1B:
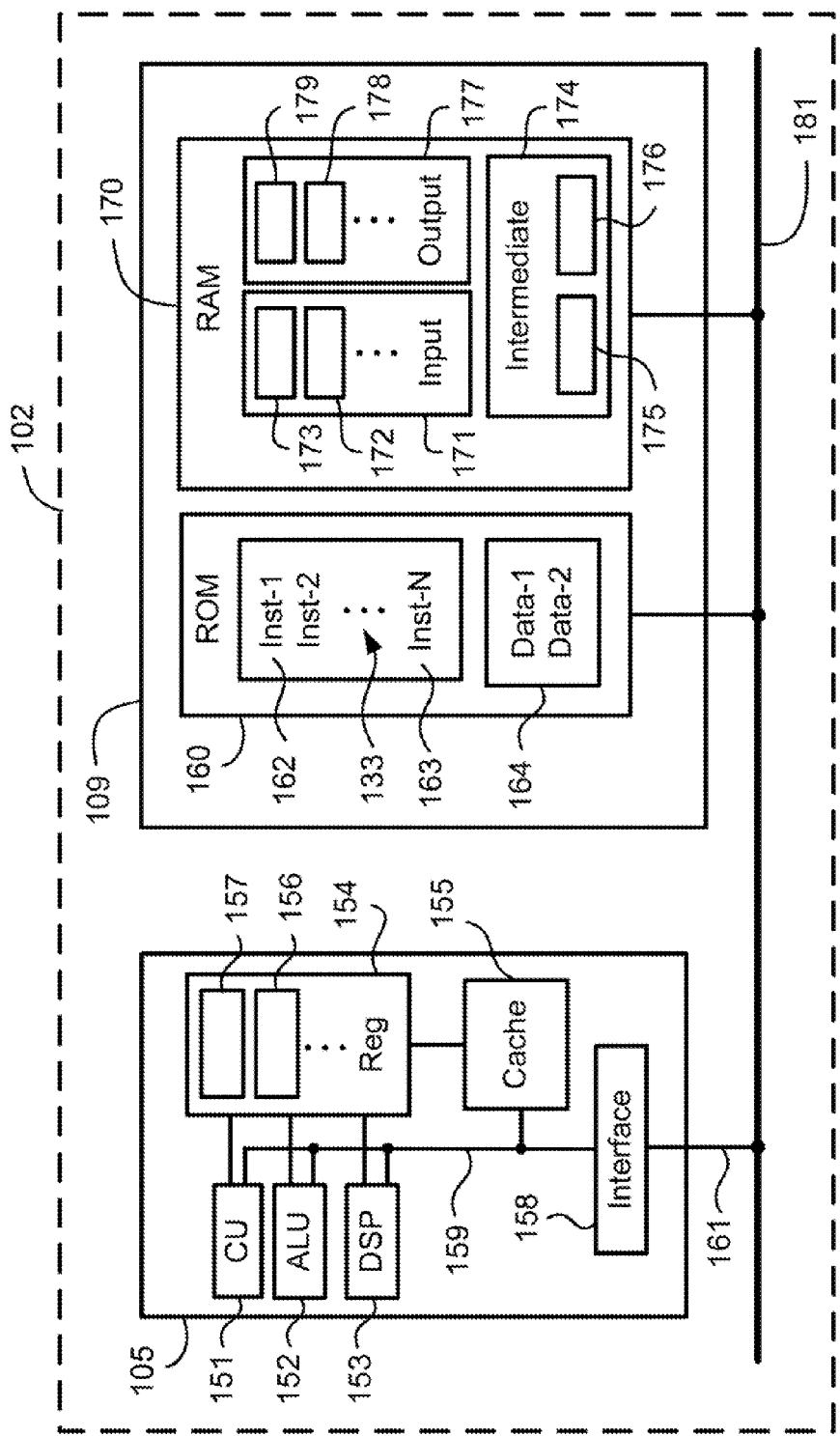

FIGS. 1A and 1B collectively form a functional block diagram representation of a printer 101 (or more generally an image forming apparatus 101) upon which described RSM arrangements can be practised. The printer 101 incorporates a general purpose electronic device including embedded components, upon which the RSM methods to be described are desirably practiced.

As seen in FIG. 1A, the printer 101 comprises an embedded controller 102 which, under control of an RSM software program 133 stored in a memory 109, controls a print engine 110 to print images according to the RSM methods on a print medium 230 as depicted by a broad arrow 211. Accordingly, the controller 102 may be referred to as an "embedded device." In the present example, the controller 102 has a processing unit (or processor) 105 which is bi-directionally coupled to an internal storage module 109. The storage module 109 may be formed from non-volatile semiconductor read only memory (ROM) 160 and semiconductor random access memory (RAM) 170, as seen in FIG. 1B. The RAM 170 may be volatile, non-volatile or a combination of volatile and non-volatile memory.

The printer 101 includes a display controller 107, which is connected to an LCD display 114. The display controller 107 is configured for displaying graphical images on the LCD display 114 in accordance with instructions received from the embedded controller 102, to which the display controller 107 is connected.

The printer 101 also includes user input devices 113 which are typically formed by keys, a keypad or like controls. In some implementations, the user input devices 113 may include a touch sensitive panel physically associated with the display 114 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 1A, the printer 101 also comprises a portable memory interface 106, which is coupled to the processor 105 via a connection 119. The portable memory interface 106 allows a complementary portable memory device 125 to be coupled to the electronic device 101 to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The printer 101 also has a communications interface 108 to permit coupling of the printer 101 to a computer or communications network 120 via a connection 121. The connection 121 may be wired or wireless. For example, the connection 121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like. The print engine 110 is connected to the embedded controller 102.

The methods described hereinafter may be implemented using the embedded controller 102, where the processes of FIGS. 4, 9, 11, 15, 17 and 19 may be implemented as one or more RSM software application programs 133 executable within the embedded controller 102. The printer 101 of FIG. 1A implements the described RSM methods. In particular, with reference to FIG. 1B, the steps of the described RSM methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 160 of the internal storage module 109. The software 133 stored in the ROM 160 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The RSM application program 133 is typically pre-installed and stored in the ROM 160 by a manufacturer, prior to distribution of the printer 101. However, in some instances, the application programs 133 may be supplied to the user encoded on one or more CD-ROM (not shown) and read via the portable memory interface 106 of FIG. 1A prior to storage in the internal storage module 109 or in the portable memory 125. In another alternative, the software application program 133 may be read by the processor 105 from the network 120, or loaded into the controller 102 or the portable storage medium 125 from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the printer 101. Examples of transitory or non-tangible computer readable transmission media that may also participate in the provision of software, application programs, instructions and/or data to the printer 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 133 and the corresponding code modules mentioned above may be executed to implement one or more graphical user interfaces (GUIs) to be rendered or otherwise represented upon the display 114 of FIG. 1A. Through manipulation of the user input device 113 (e.g., the keypad), a user of the printer 101 and the RSM application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 1B illustrates in detail the embedded controller 102 having the processor 105 for executing the application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the printer 101 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 through 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the printer 101. Typically, the application program 133 waits for events and subsequently executes the block of code associated with that event. Events may be triggered in response to input from a user, via the user input devices 113 of FIG. 1A, as detected by the processor 105. Events may also be triggered in response to other sensors and interfaces in the printer 101.

The execution of a set of the instructions may require numeric variables to be read and modified. Such numeric variables are stored in the RAM 170. The disclosed method uses input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the RSM methods described below is associated with one or more segments of the application program 133, and is performed by repeated execution of a fetch-execute cycle in the processor 105 or similar programmatic operation of other independent processor blocks in the printer 101.

[Inkjet Printer and Print Head]

Figure 2:
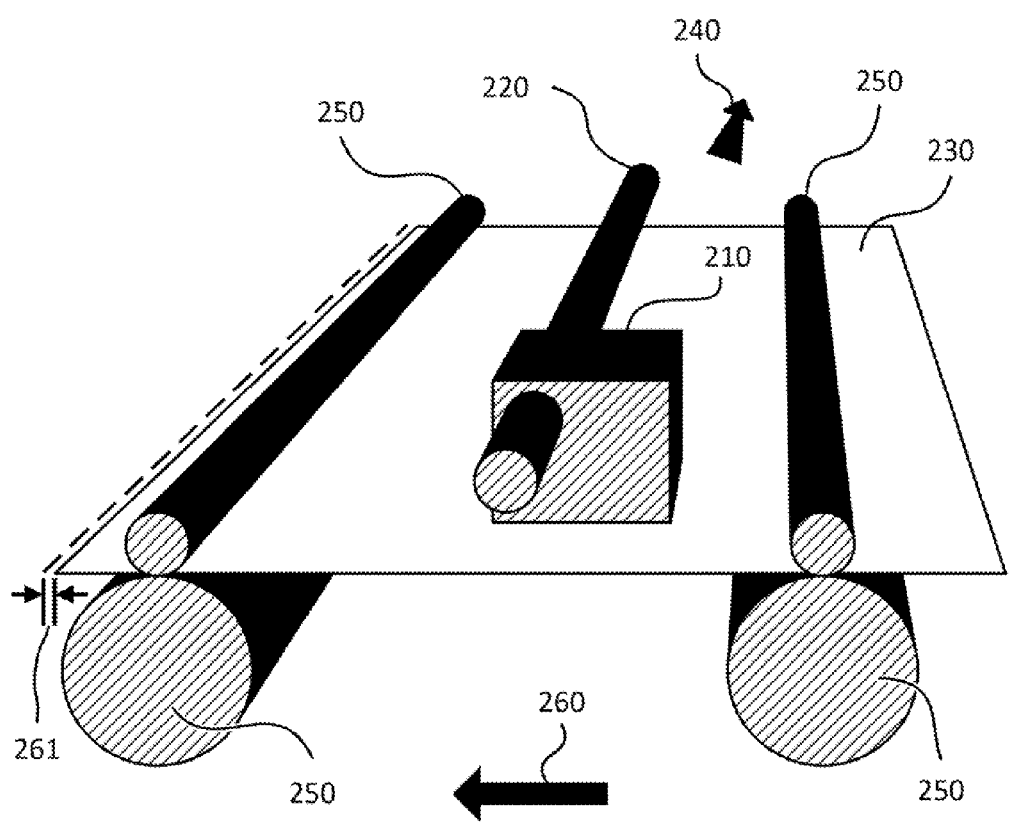
FIG. 2 illustrates a simplified representation of the mechanical layout of an inkjet printer with a moving printing head.

FIG. 2 illustrates a simplified representation of the internal arrangement of an inkjet printer. The arrangement comprises a print mechanism comprising a print head 210 having ink ejection nozzles (not illustrated) organised into banks (also referred to as groups) based on colour and/or ink volume. It will be appreciated that in some configurations, the print mechanism may incorporate more than one print head. The print head 210 is mounted on a carriage 220 which transverses a print medium 230 (which may also be referred to as a substrate) and forms image swaths during either or both of a forward passage in a scan direction 240, and a reverse passage opposite to the scan direction 240, by controlling the ejection of ink from the ink ejection nozzles within the nozzle banks. The inkjet printer further comprises a print medium advance mechanism 250, which transports, in discrete distance increments D, the print-medium 230 in a direction 260 perpendicular to the print head scan direction 240. The discrete distance increment D, depicted by a reference numeral 261, that the print medium is advanced by the print medium advance mechanism 250 is called the line feed distance. Two line feed distances are referred to in this description, namely a design line feed distance $D^d$ and an actual line feed distance LF.

Figure 3:
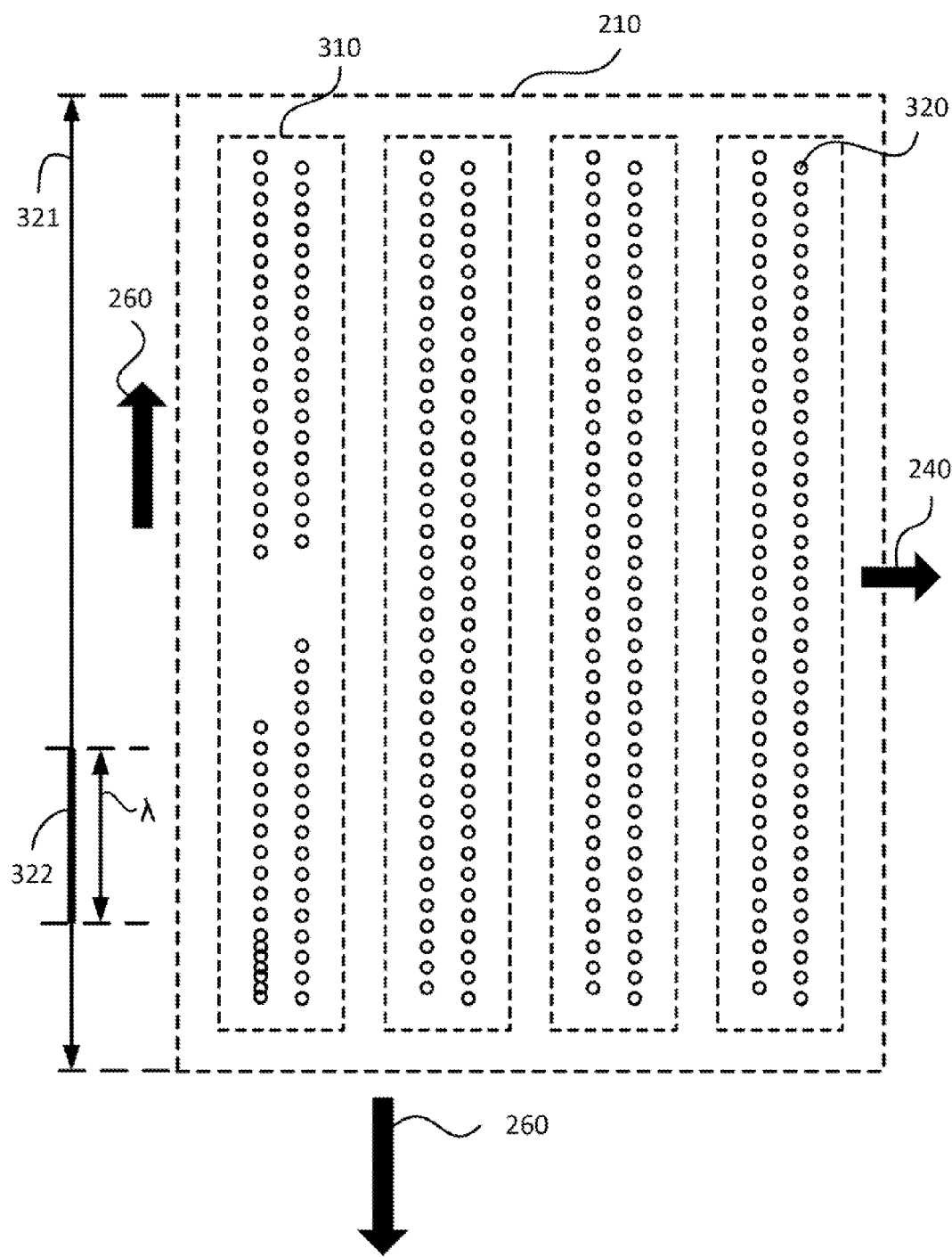
FIG. 3 illustrates a typical layout of ink ejection nozzles of an inkjet print head.

FIG. 3 illustrates a typical layout of the ink eject nozzle banks 310 of the print head 210. Each nozzle bank 310 consists of multiple ink ejection nozzles 320. In order for an inkjet printer to produce images which do not contain noticeable visual artefacts, alignment is required between the nozzle banks 310 used within the same passage, and between the nozzle banks 310 used during the forward and backward passages respectively. The print medium advance mechanism 250 must also be calibrated to advance the print medium 230 in order to correctly align swaths.

To produce optimal image quality it is necessary to characterise each individual printing system, and calibrate components of that printing system accordingly.

[System Overview]

Figure 4:
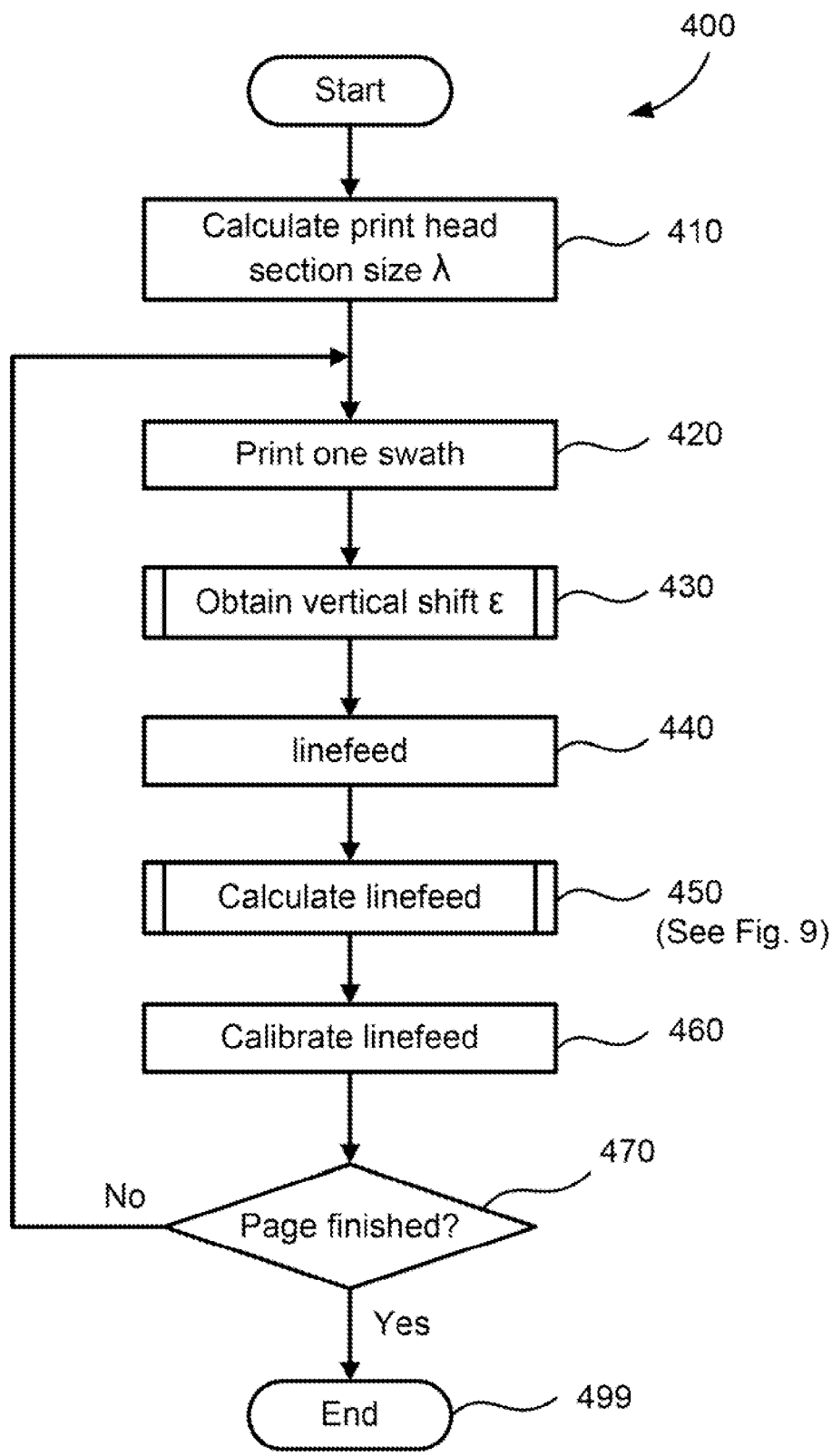
FIG. 4 shows a general flow diagram of the process of measuring and calibrating the exact displacement of the printer head between overprints in a first RSM arrangement.

FIG. 4 illustrates common processes 400 of the RSM arrangements. The aim of the processes is to measure and calibrate the linefeed distance D of a to-be-analysed printer.

A step 410 divides a length 321 of the print head 210 lengthwise into several sections such as 322 (depicted by a heavy line), and determines a section size λ of each section 322, assuming that the full length 321 of the print head is known. In a following step 420, the printer prints one swath, that is, the print head transverses the print medium either in the direction 240 indicated in FIG. 2 or in the direction opposite to 240.

A following step 430 then determines a vertical shift (ie a vertical distance) ϵ, also referred to as a sensor position parameter (or a head sensor position parameter), between the position of a sensor (not shown) attached to the print head 210 and the position of the section 322 of the print head, where the position and size λ of this particular section 322 are determined in the step 410. The term "vertical" means in the direction of (or opposite to) the arrow 260 which is the line feed direction as can be seen in FIG. 2. The sensor position parameter can be used to improve the performance of the RSM arrangements for determining the error between a nominal design line feed distance and the actual line feed distance. The sensor position parameter can also be beneficially used in other image forming apparatus applications.

The step 430 can be performed at any time while the print head 210 prints a first swath in the direction 240. The step 430 can be performed by a back sensor 560 (see FIG. 5), up to the point that the print head 210 reaches the (right hand) edge of the print medium 230 and prior to a line feed step 440 referred to below. The step 430 can be performed as long as the back sensor 560 is able to capture image(s) of the first swath being or having been printed.

The advance mechanism 250 then transports the print medium 230 in the direction of 260 by one linefeed distance D in a following step 440, thereby repositioning the print medium 230.

A following step 450 determines the actual linefeed distance LF using the section size λ determined in the step 410 and the vertical shift ϵ determined in the step 430.

The step 450 can be performed at any time while the print head 210 now prints a second swath in the opposite direction to 240. The step 450 can be performed either by a sensor 550 (see FIG. 5) which is now the back sensor trailing the print head 210, or by the sensor 560 which is the front sensor leading the print head 210. The step 450 can be performed up to the point the print head 210 reaches the (left hand) edge of the print medium 230, as long as the back sensor 550 and/or the front sensor 560 are able to capture image(s) of the first swath.

In one RSM arrangement, as the print head 210 prints a swath to the right, the front sensor 550 measures the actual line feed LF, and the back sensor 560 measures the sensor position parameter ϵ. As the print head 210 subsequently prints a next swath to the left, then the front sensor 560 measures the actual line feed LF and the then back sensor 550 measures the sensor position parameter ϵ.

Other RSM arrangements can be implemented, using one or two sensors, and single or multi-pass measurement cycles.

A following step 460 calibrates the linefeed distance by comparing the actual linefeed distance LF and the designed linefeed distance $D^d$.

Once the print head is calibrated, a following step 470 determines if the printing of the page is finished. If this is not the case, the process 400 follows a NO arrow back to the step 420 that prints the next swath, using information about the corrected (actual) linefeed distance LF when printing the next swath.

If however the printing of the page is finished, the process 400 follows a YES arrow to an END step 499. In this manner the printer prints the next swath as long as the end of the page is not reached. This calibration and printing process continues for each swath until the print head reaches the end of the page as determined by the step 470.

Accordingly, in the RSM arrangements the sensor position parameter ϵ is determined during or at the end of printing a particular swath, prior to the following line feed, by a back sensor which is a sensor which trails the print head as it prints the swath in question. The actual line feed LF is determined during or at the end of printing a particular swath, following a line feed, by a front sensor that is a sensor which leads the print head as it prints the swath in question.

Figure 5:
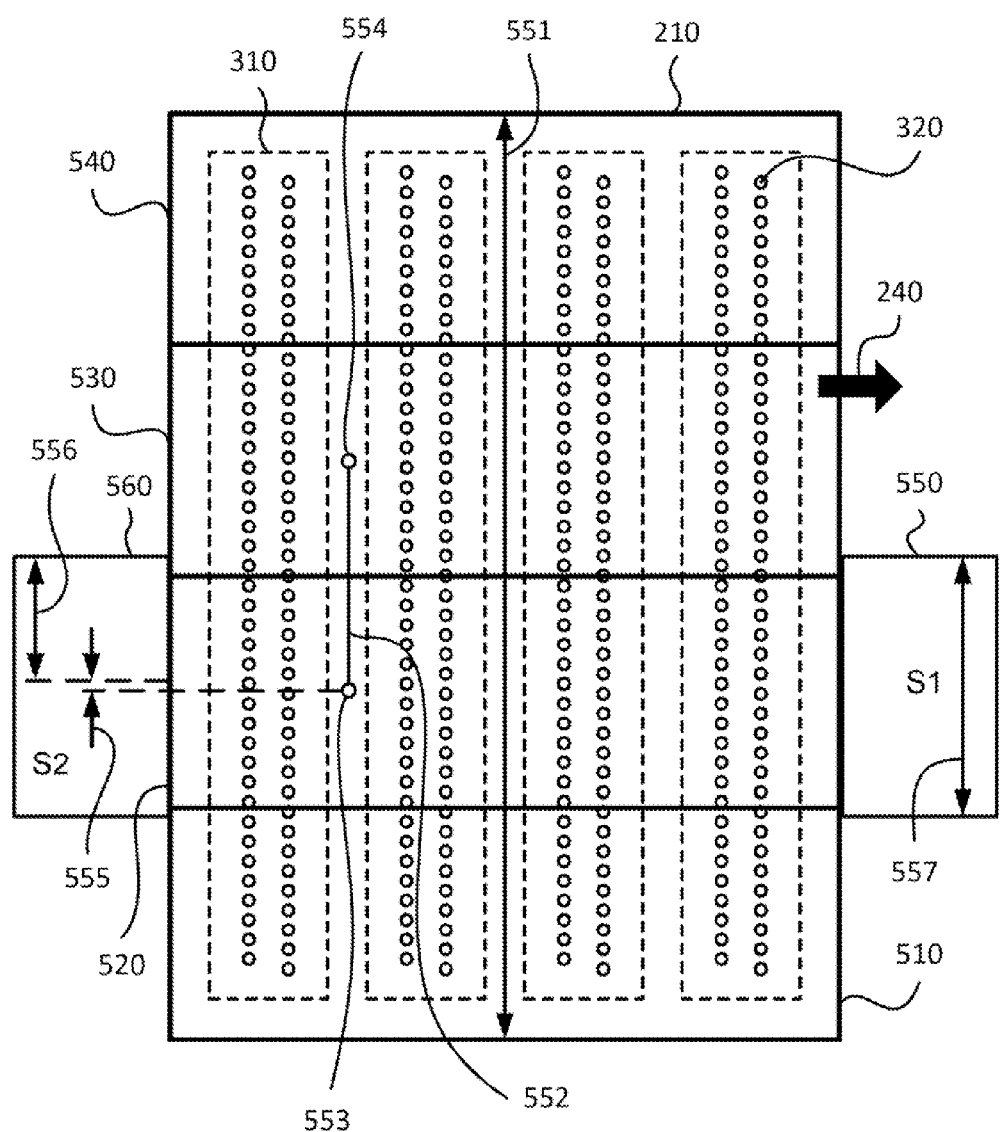
FIG. 5 illustrates a typical layout of an inkjet print head and the sensors.

When two sensors are used as depicted in FIG. 5, described below, the sensor 560 is the back sensor trailing the print head 210 as the print head prints a swath in the direction 240. During printing of this swath the sensor position parameter ϵ can be determined based upon information gathered by the back sensor 560. After the print head 210 reaches the right hand edge of the print medium 230, a line feed is effected and the print head 210 prints a next swath in the direction opposite to 240. During printing of this swath the sensor 560 is the front sensor leading the print head 210 as the print head prints the swath. During printing of this swath the actual line feed LF can be determined based upon information gathered by the front sensor 560.

[First RSM Arrangement]

The first RSM arrangement is designed to measure and calibrate the linefeed distance of a printer in real time.

Referring to FIG. 4, the first step 410 determines print head section size λ given the full length 321 of the print head, where the length 321 of the print head refers to the dimension along the direction of 260 and perpendicular to the direction 240 in FIG. 2.

FIG. 5 gives one example of how a print head 210 can be divided into sections. A full length 551 of the print head 210 is, in this example, divided evenly into 4 sections 510, 520, 530 and 540. Consequently the section size λ of each section is one fourth of the full length 551 of the print head 210. The distance 552 between vertical centres 553, 554 of the two neighbouring sections 520, 530 is also λ.

Note that the division of the print head length 210 can be done in many different ways. The sections do not have to be the same size. In this RSM arrangement, the section size is chosen so that the length λ of each section is of the same order of the designed linefeed $D^d$ distance of the to-be-analysed printer.

FIG. 5 also illustrates two image sensors S1 and S2. They are attached to the side of the print head, as shown at 550 and 560, respectively. These two image sensors S1, S2 are capable of recording 2-D images in high resolution. When the print head 210 moves in the direction 240, the sensor S1 acts as a front sensor leading the print head and the sensor S2 acts as a back sensor trailing the print head. When the print head moves in the opposite direction to 240, the sensor S1 acts as a back sensor trailing the print head and the sensor S2 acts as a front sensor leading the print head. In this example of a RSM arrangement, these two sensors S1 and S2 have the same dimensions and are rectangular in shape. They are located at approximately the same vertical position relative to each other (measured downwards from the top of the page), and both at approximately the same vertical position relative to the section 520. There is however a small vertical shift (ie displacement) 555 (referred to as a sensor position parameter $\epsilon$) between the vertical position of the sensors and the vertical position of the second quarter 520 of the print head (where the position of the sensor S2 is nominally defined as the midpoint 556 of the sensor S2 and the position of the section 520 is nominally defined as the midpoint 553 of the section 520). The vertical dimension 557 of the sensors S1, S2 can vary depending on the accuracy requirement of the system and the measurement cost. The sensors can, in one example, be 1-D line sensors, which can obtain 2-D image by shuttering continuously while moving in the direction of 240 or opposite to 240. In this RSM arrangement, the vertical dimension 557 of the sensors is chosen to be slightly bigger than the section size λ, as illustrated in FIG. 5.

Referring back to FIG. 4, once the print head is divided into sections in the step 410, the printer prints one swath in the step 420, which means that the print head 210 transverses the print medium once in the direction 240 indicated in FIG. 2 or in the direction opposite to 240.

Figure 6:
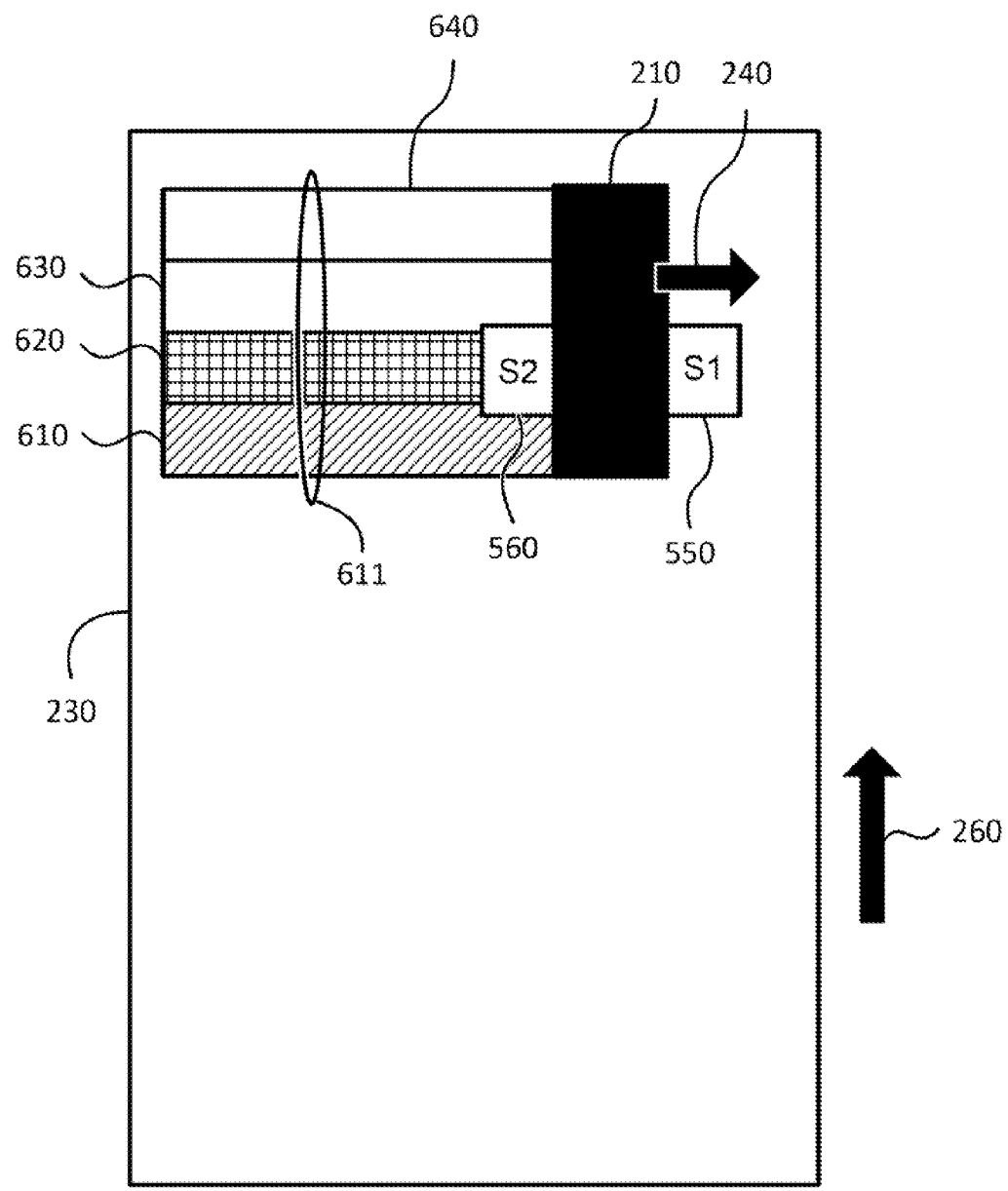
FIG. 6 illustrates the printing process of one overprint.

FIG. 6 depicts an example of a printing process where the print head 210 moves in the direction 240. In FIG. 6, the print medium is associated with the reference numeral 230. The print head 210 and the two sensors 550 and 560 are shown in the middle of a current swath 611. When the print head 210 moves across the print medium 230 in the direction 240, the head 210 prints dot patterns having a random distribution, for example binary patterns which are obtained by half-toning a continuous-tone image.

Figure 7:
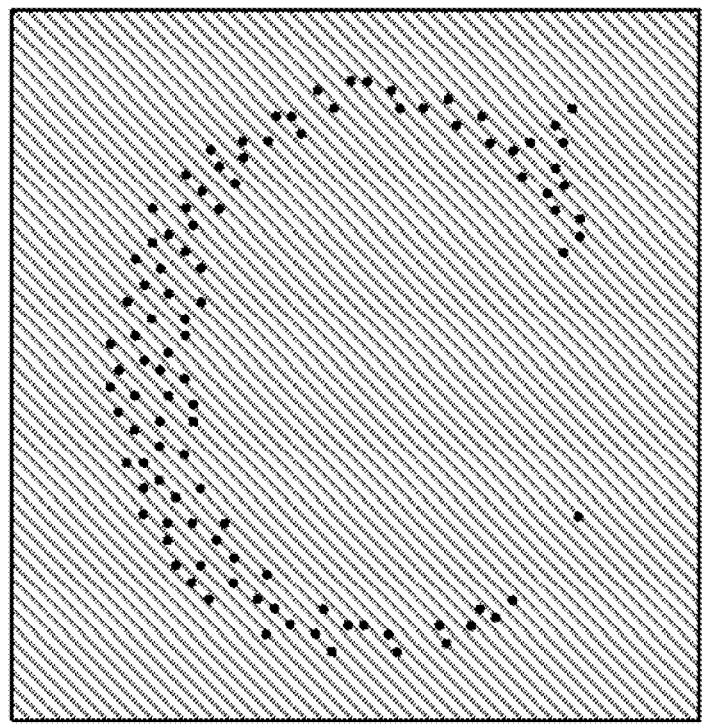
FIG. 7 gives an example of a printed swath consisting of random dot patterns.

FIG. 7 shows an example of a printed letter 'C' after one swath.

In FIG. 6, a reference numeral 610 depicts a part of a printed image that is printed by the first quarter 510 of the nozzle bank 310 (ie the first section of the nozzle bank 310), a reference numeral 620 depicts a part of the printed image that is printed by the second quarter 520 of the nozzle bank 310 (ie the second section of the nozzle bank 310), and so on.

After the printer prints one swath 611, the step 430 obtains the vertical shift $\epsilon$ between the second section 520 of the print head 210 and the sensor S2 (ie 560). It is noted that in general the sensor position parameter $\epsilon$ is different for each of the sensors 550 and 560. In the present RSM arrangement, for a particular printer, the vertical shift (ie displacement) $\epsilon$ between the position of a particular section of the print head and the position of the sensor, is provided as part of the specification of the printing system, and is thus, for example, stored in the memory 106. Although the value of $\epsilon$ can change during the printing process, mostly due to the temperature rise that occurs during the printing process, it is assumed to be a constant in this particular RSM arrangement.

Figure 8A:
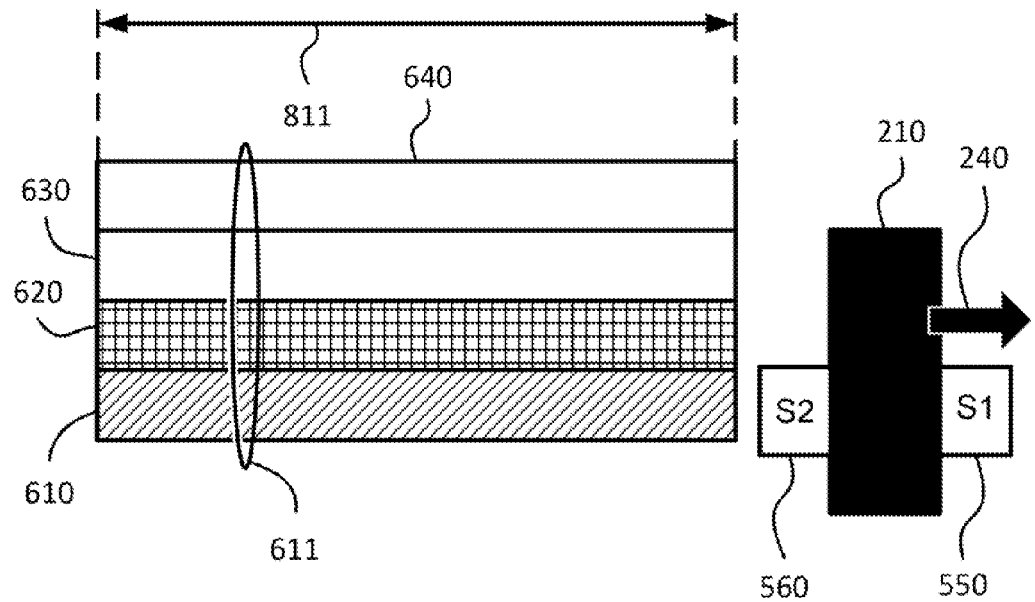
FIGS. 8A and 8B illustrate the relative positions of the overprints and the print head after a linefeed.

Then the print medium advance mechanism 250 performs a linefeed in the step 440 and moves the print medium 230 upwards in the direction 260. Thereafter, the current positions of the previously printed swath 611 and the print head 210 are depicted in FIG. 8A. Note the change in the vertical position of the print head compared to FIG. 6.

Figure 8B:
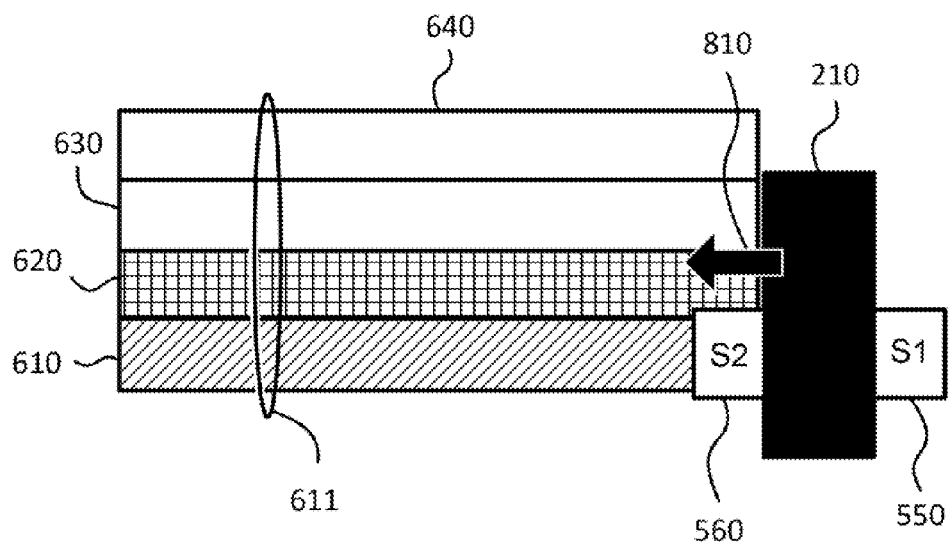
Figure 9:
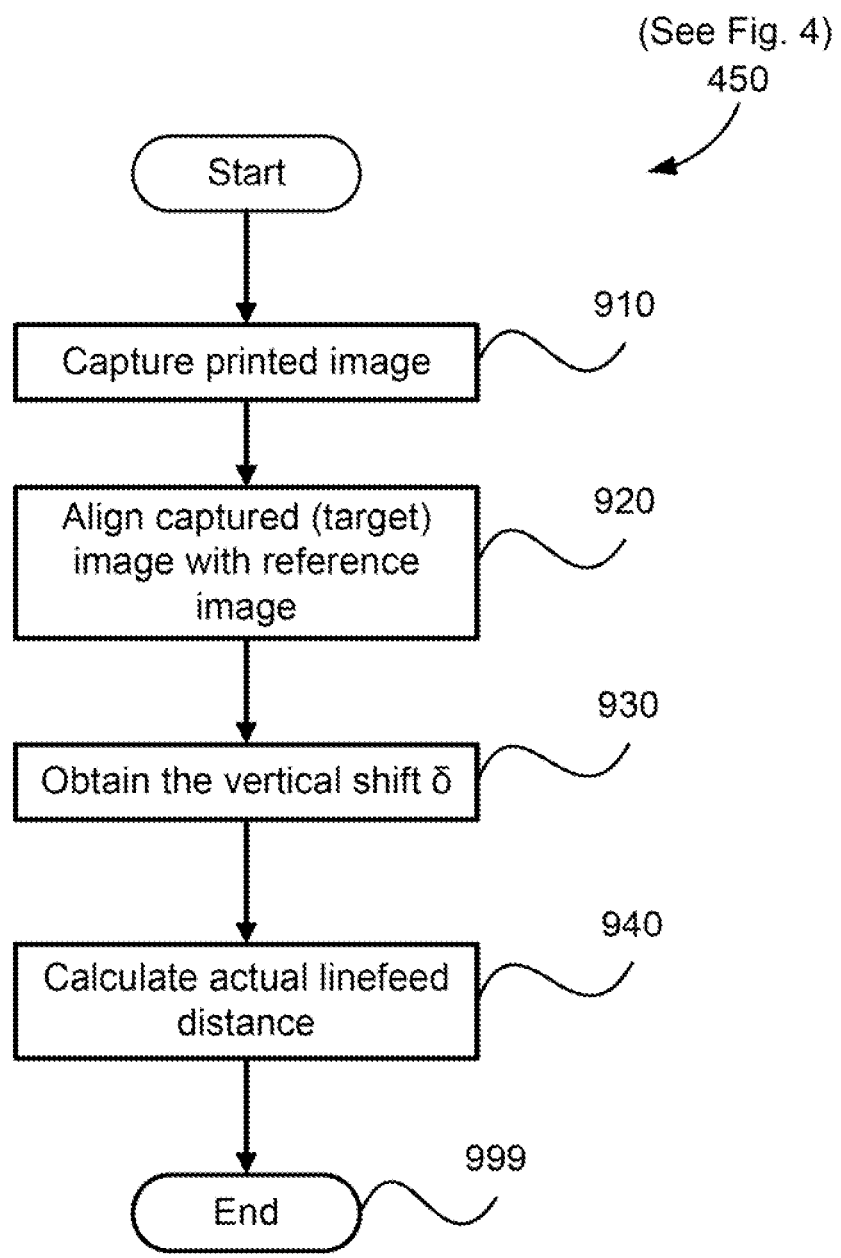
FIG. 9 shows a simplified flow diagram of the process where the vertical shift δ is determined.

FIG. 9 is a flow chart of a process for determining the actual linefeed distance LF from parameters $\delta$, $\epsilon$, and $\lambda$ that are described in more detail in regard to equations (1)-(3). After the linefeed step 440, the print head 210 moves in a direction 810 opposite to 240 to print the next swath. When the print head 210 reaches the edge of the printing area (ie the edge of the print medium 230), as shown in FIG. 8B, the sensor S2 can start capturing images that represent parts of the previously printed swath 611, as described in a step 910.

As an inkjet printer prints, the printer generally has information about the dot pattern to be printed at each swath, which means that it is known which nozzles print a dot and which nozzles are idle. Consequently, a reference image for the just-printed swath can be constructed. A reference image is information about the locations of the dots that are to be printed.

Figure 20:
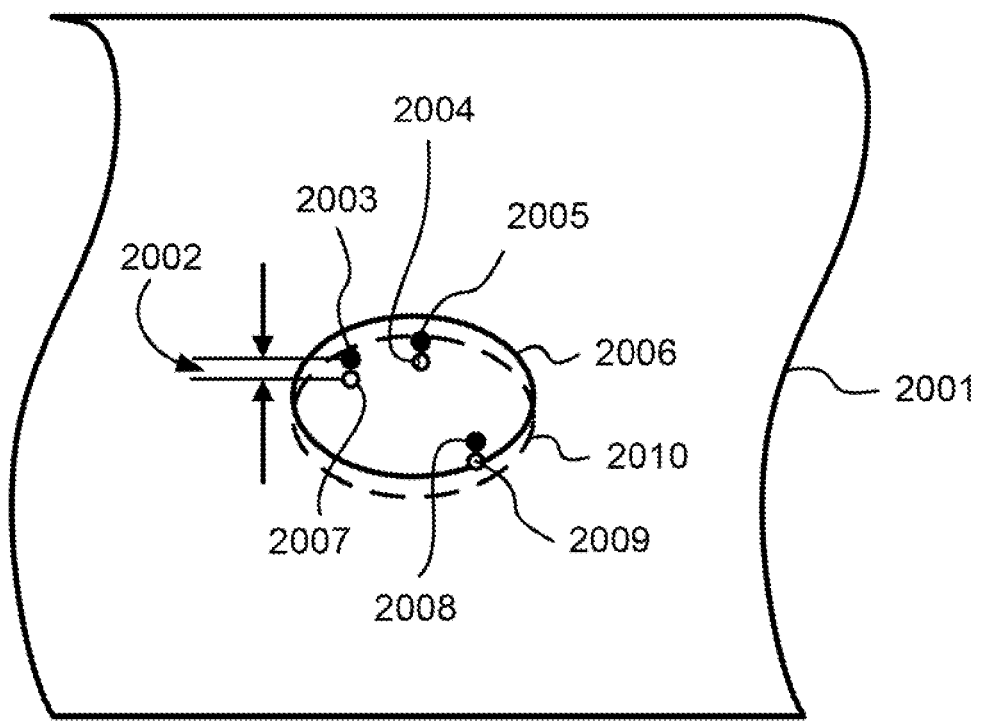
FIG. 20 illustrates how comparison between a reference image and a captured target image can yield a relative displacement measurement.

FIG. 20 depicts a swath 2001 and a region 2006 of a reference image to be printed on the print medium 230. The reference region 2006 contains three dots 2003, 2005 and 2008 to be printed. The print head 210 prints, in accordance with the aforementioned reference information, a swath on the print medium 230. A region 2010 of the printed swath on the print medium 230 contains three dots 2007, 2004 and 2009 corresponding to the reference dots 2003, 2005 and 2008. The region 2010 is captured as a target image by one of the print head sensors 550, 560. A vertical shift 2002 is evident between the reference image region 2006 and the captured target image region.

Referring back to FIG. 8, given the section information from the step 410 and the reference image of the whole swath 611, it is possible to determine part of the reference image which corresponds to the part 610 of the swath 611 printed by the section (ie the first quarter) 510 of the print head 210.

Once the reference image is constructed, a vertical shift (displacement) $\delta$ between an image of the part 610 of the swath 611 (referred to as a "target image") captured by the sensor S2, and the reference image, can be determined by aligning the reference image and the target image, as depicted in following steps 920 and 930. The alignment can be performed in the Fourier domain by convolving the target image and the reference image.

Figure 10B:
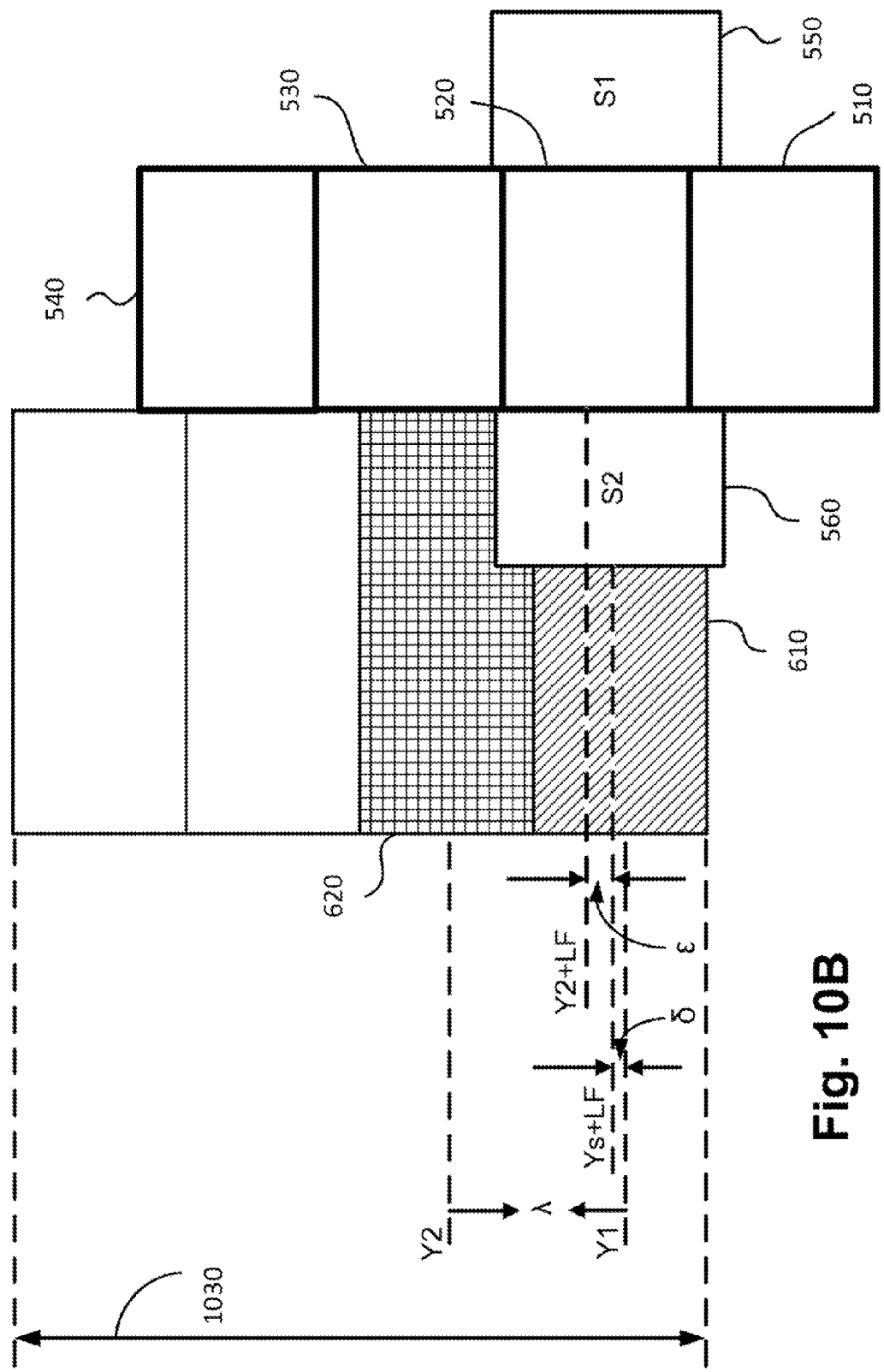

FIGS. 10A and 10B depict the relative positions of a reference image 1010, and a target image 1020 captured in the step 910 by the sensors.

FIG. 10A shows an example of the reference image 1010 associated with the area covered by the sensor S2, and the target image 1020 captured by sensor S2. By aligning the reference image 1010 and the target image 1020 in FIG. 10A, a 2-D shift (ie 2-dimensional displacement) between the reference image and the target image can be determined. Assuming that only the vertical displacement of the print head is of interest, that is the displacement representing the actual linefeed distance LF, then the relationship between the actual linefeed distance LF and the vertical shift δ between the reference image 1010 and the target image 1020 can be determined.

Referring to FIG. 10B, if the vertical centre of the second quarter (ie the second part) 620 of the previously printed swath is at position Y2, the vertical centre of the first quarter 610 of the previously printed swath is at position Y1, the vertical centre of the sensors before the linefeed in the step 440 is at position Ys and the actual linefeed distance is LF, then the following relationships are defined:

1. $\delta = Ys + LF - Y1,$ (1)

2. $\epsilon = (Y2 + LF) - (Ys + LF) = Y2 - Ys,$ (2)

3. $\lambda = Y2 - Y1,$ (3)

where δ is the vertical shift what can be obtained through alignment in the step 920 and ε is the vertical shift between the second quarter of the print head and the sensors. Note that the λ defined above is the same as the λ defined in the step 410, as shown in FIG. 5. Since the values of ε and λ are assumed to be known and constant in this RSM arrangement, we can determine the actual linefeed distance LF that occurs after the swath 611 consisting of the swath parts 610~640 in the following step 940 as follows:

$$LF = \delta + \epsilon - \lambda.$$ (4)

Referring back to FIG. 4, after the actual linefeed distance LF is determined in the step 450, its value is compared to the designed linefeed distance $D^d$ in a following step 460. The print head then compensates for the discrepancy between the actual linefeed distance LF and the designed linefeed distance $D^d$ by controlling the ejection of ink from the ink ejection nozzles within the nozzle banks. Alternatively, the compensation can be done by interpolating original continuous-tone image or adjusting position of paper again. If the page is not finished (as determined by the step 470), the print head prints the next swath (in the step 420), which means the print head moves in the direction opposite to 240 and ejects ink from the nozzles 320 in a pattern calibrated in the step 460. Because the linefeed distance is common through every section 322 of the print head 210, the linefeed calibration can be applied to the full length 321 of the print head 210 even if the sensors S1, S2 don't cover the full length 321 of the print head 210. Moreover, because the linefeed distance is common through the width 1030 of a swath, the linefeed calibration can be applied to the full width 1030 of a swath even if the sensors capture only a partial width of the swath.

Figure 12A:
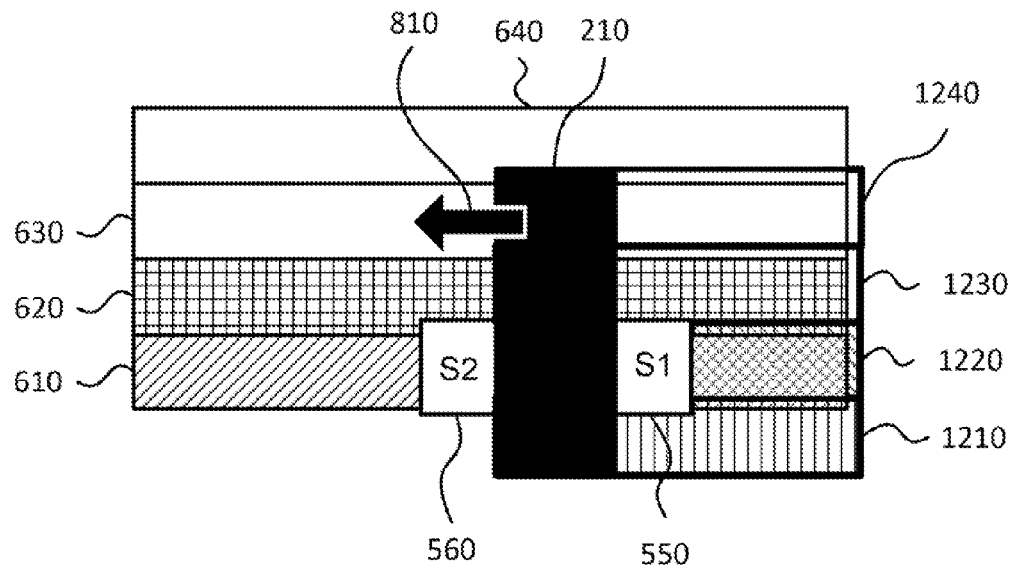
FIGS. 12A and 12B illustrate the relative positions of different sections of the print head and the printed swaths.
Figure 13A:
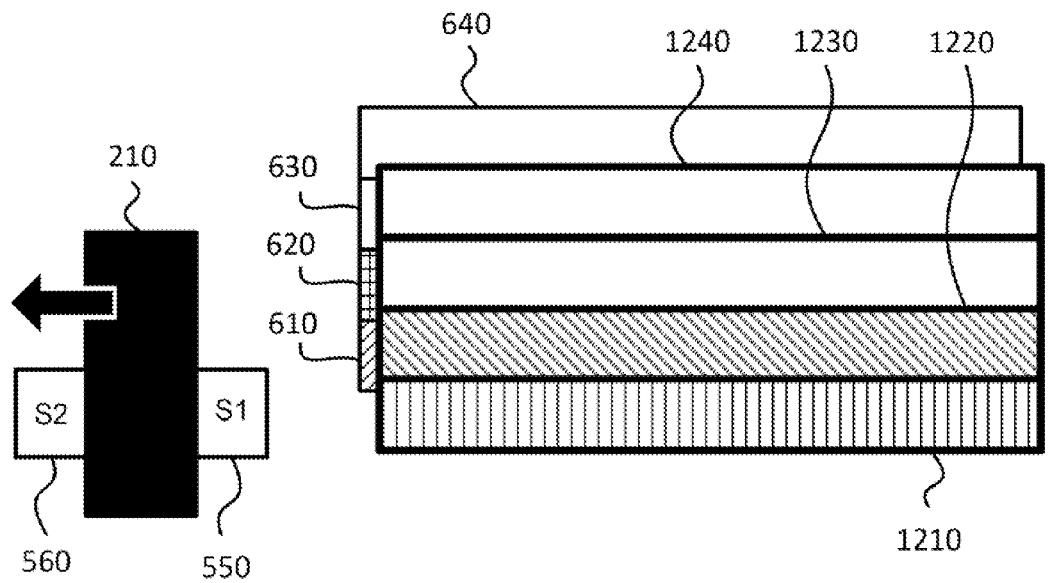
FIGS. 13A and 13B illustrate the relative positions of the overprints and the print head after a linefeed.

FIG. 12A depicts the printing process where the print head moves in the direction 810 opposite to 240. In FIG. 12A, 1210 indicates the part of the printed image that is printed by the first quarter 510 of the print head 210, 1220 indicates the part of the printed image that is printed by the second quarter 520 of the print head 210, and so on. Note the swath consisting of 1210~1240 is printed on top of the swath consisting of 610~640. After the print head finishes the swath consisting 1210~1240, the vertical shift ε is obtained in the step 430. In this RSM arrangement, the value of ε is assumed to be known and constant. Then the print medium advance mechanism 250 moves the print medium 230 upwards in the direction of 260, as described in the step 440. The current positions of the previously printed swath and the print head are depicted in FIG. 13A.

Figure 13B:
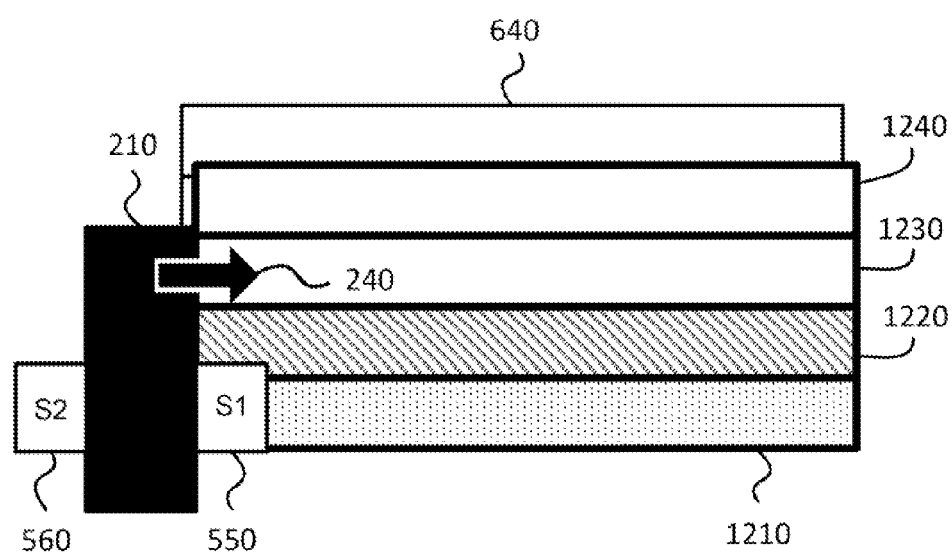

The print head then moves in the direction of 240 again to print the next swath. When the print head reaches the edge of the printing area, as shown in FIG. 13B and the print head moves in the direction of 240, the sensor S1 captures an image that represents part of the previously printed swath, as described in the step 910. Similarly, given the section information in the step 410 and the reference image of the whole swath, the reference image that is part of 1210 printed by the first quarter 510 of the print head can be constructed.

Figure 14:
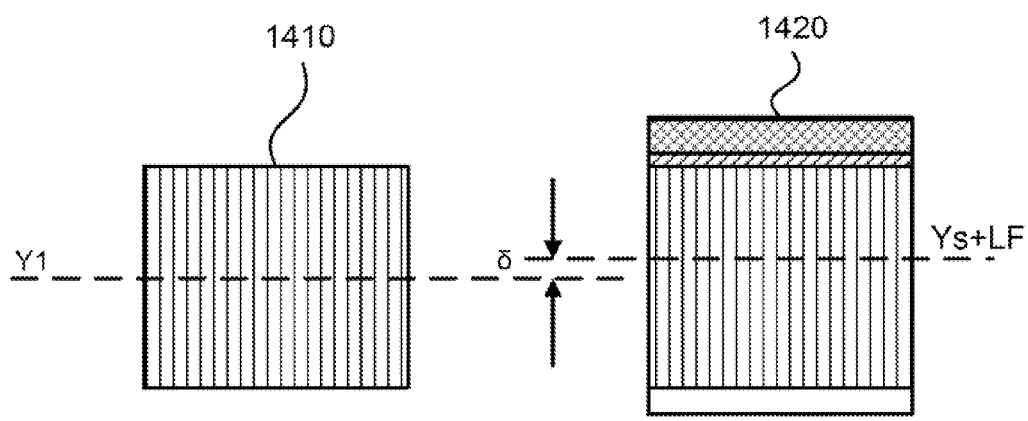
FIG. 14 shows an example of the image alignment process.

FIG. 14 gives an example of a reference image 1410 and the target image 1420 captured by the sensor S1, where 1410 is part of 1210 printed by the first quarter 510 of the print head. By aligning the captured target image 1420 and the reference image 1410 in FIG. 14 and using equation (1), (2), (3) and (4), we can determine the actual linefeed distance LF for the linefeed that occurs after printing of the swath consisting of 1210~1240.

This linefeed measuring, calibration and printing process continues until the end of the page is reached. To calibrate the linefeed that occurs after a swath in the direction of 240, the sensor S2 captures the target image and the next swath in the direction opposite to 240 is calibrated according to the measured linefeed distance. In order to calibrate the linefeed that occurs after a swath in the direction opposite to 240, the sensor S1 captures the target image and the next swath in the direction of 240 is calibrated according to the new measured linefeed distance.

It should be noted that the print head does not need to print in both directions. If the print head prints a swath only in the direction of 240 or only in the direction opposite to 240, only one sensor is needed. The measuring and calibration process will be essentially the same.

[Second RSM Arrangement]

The second RSM arrangement is designed to measure and calibrate the linefeed distance of a printer in real time.

As described previously, the value of the vertical shift ε (also referred to as the head sensor position parameter) between a particular section of the print head and the sensor, although provided as part of the specification of the printing system, can change during the printing process, and the amount of change is sometimes not negligible. The value of ε changes mostly due to a rise in the temperature during printing, although other factors such as mechanical vibration etc. can also cause the change. In order to more accurately determine the actual linefeed distance, the precise value of ε, or a reasonable estimate of ε can be used.

Figure 11:
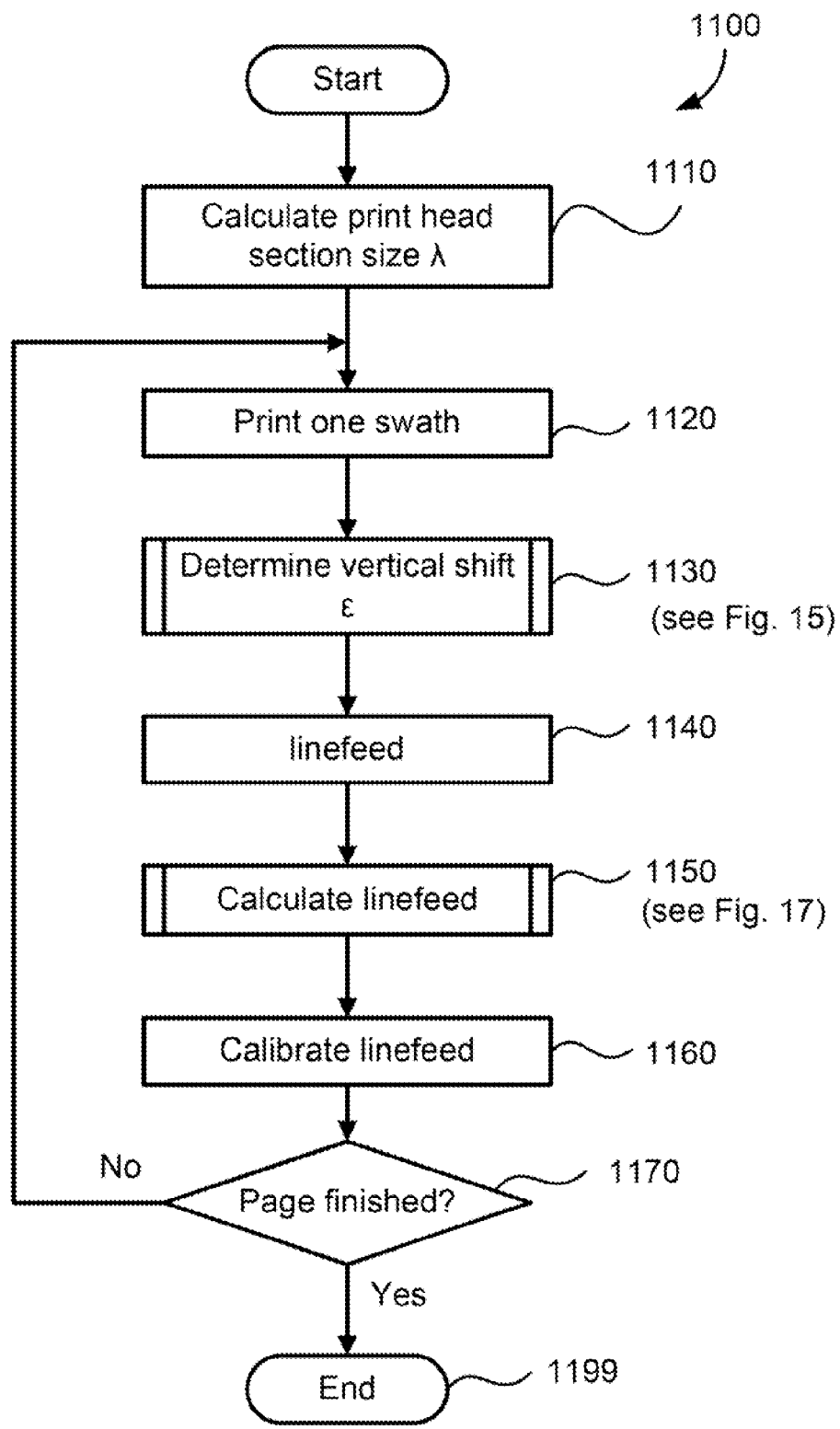
FIG. 11 shows a simplified flow diagram of the process of measuring and calibrating the exact displacement of the printer head between overprints in a second RSM arrangement.

FIG. 11 describes a process for performing the second RSM arrangement. In FIG. 11, a step 1110 determines the print head section size λ. In this RSM arrangement, we divide the print head lengthwise in the same way as the first RSM arrangement. That is, the full length 321 of the print head 210 is divided evenly into 4 sections, 510, 520, 530 and 540. Consequently the section size λ is one fourth of the full length of the print head. The distance between the vertical centres of two neighbouring sections is also λ.

Note that the division of the print head length 210 can be done in many different ways. The sections do not have to be the same size. In this RSM arrangement, the section size is chosen so that the length of each section is of the same order as the designed linefeed distance $D^d$ of the to-be-analysed printer.

The two sensors S1 and S2 are set up in the same fashion as in the first RSM arrangement. They are attached to the side of the print head 210, as shown by the reference numerals 550 and 560. These two image sensors are capable of recording 2-D images in high resolution. In this RSM arrangement, these two sensors have the same dimensions and are rectangular in shape. They are both at approximately the same vertical position, and approximately at the same vertical position of the section 520, although there is a small vertical shift ϵ between the sensors and the second quarter of the print head 520. The vertical dimension of these sensors can vary depending on the accuracy requirement of the system and the measurement cost. In this RSM arrangement, the vertical dimension is chosen to be slightly bigger than the section size λ, as illustrated in FIG. 5.

Referring back to FIG. 11, once the print head is divided into sections, the printer prints one swath in a following step 1120, which means the print head transverses the print medium once in the direction 240 indicated in FIG. 2 or in the direction opposite to 240. FIG. 6 illustrates an example of the printing process where the print head moves in the direction of 240. During the printing of the swath 610~640, the process 1130 determines the value of the vertical shift ϵ between the second quarter of the print head and the sensors. Instead of being a known constant as in the first RSM arrangement, in the present RSM arrangement the value of the vertical shift ϵ between the second quarter of the print head and the sensor is measured and a new value is used for every linefeed. In some alternate RSM arrangements, the vertical shift ϵ does not have to be updated for every linefeed, updating it once for a whole page can be sufficient depending on required accuracy.

Figure 15:
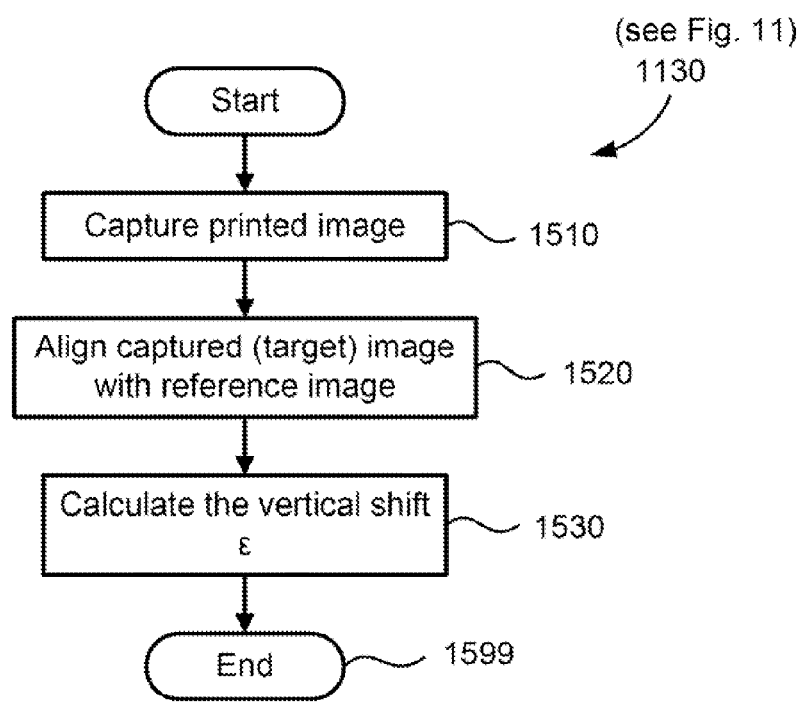
FIG. 15 shows a simplified flow diagram of the process where the vertical shift $\epsilon$ is determined.

The determination of the vertical shift ϵ (in the step 1130) is described in detail in regard to FIG. 15.

In a step 1510, the sensor S2 captures a target image while the print head is moving across the print medium, as illustrated in FIG. 6.

Figure 16:
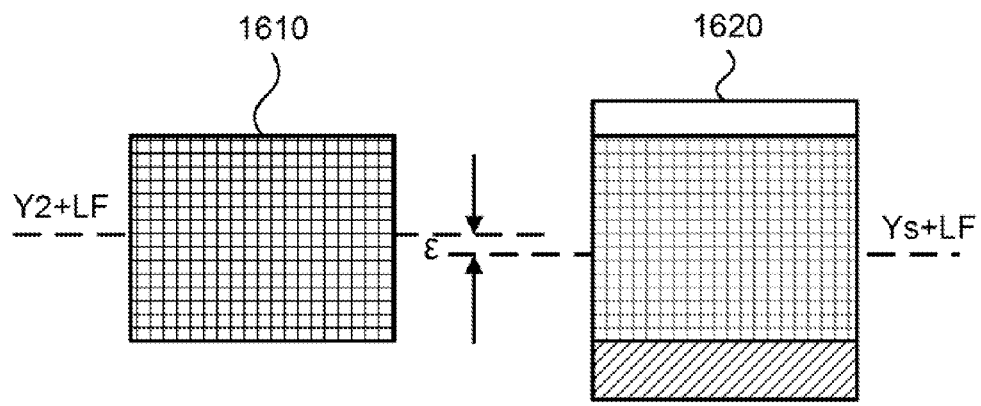
FIG. 16 shows an example of the image alignment process.

FIG. 16 depicts an example of a target image 1620 captured by the sensor S2 and a corresponding reference image 1610. Accordingly, in FIG. 16, 1620 refers to the target image captured by the sensor S2 and 1610 refers to the reference image of the second quarter 620 of the previously printed swath. By aligning the reference image 1610 and the target image 1620 (in the step 1520), the vertical shift ϵ can be determined (by the step 1530 as depicted in FIG. 16 with reference to the equations (1)-(2)).

Referring back to FIG. 11, after the determination of the vertical shift ϵ, the print medium advance mechanism 250 moves the print medium 230 upwards in the direction of 260 (in a following step 1140). The relative positions of the print head and the previously printed swath are shown in FIG. 8A. The print head then moves in the direction opposite to 240 to print the next swath, as shown in FIG. 8B.

Figure 17:
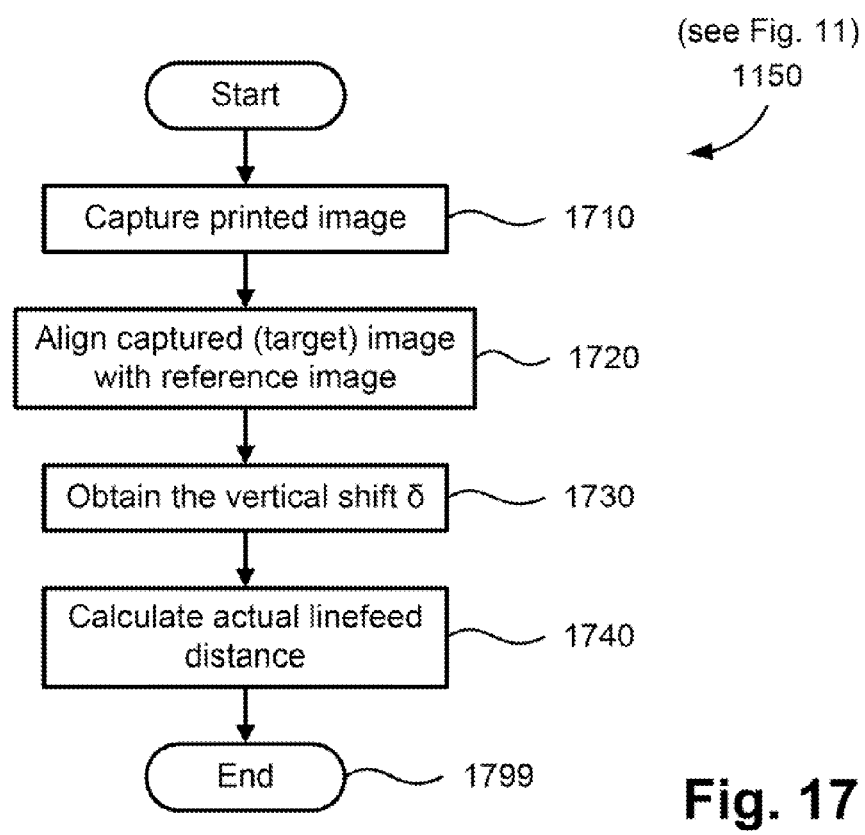
FIG. 17 shows a simplified flow diagram of the process where the actual linefeed distance is determined.

FIG. 17 depicts the linefeed calculation process in the step 1150. The process 1150 is essentially the same as the process 450 in FIG. 4.

When the print head is at the position illustrated in FIG. 8B, sensor S2 captures an image that represents part of the previously printed swath, in a step 1710. FIG. 10A shows an example of the target image captured by the sensor S2 and the corresponding reference image. In FIG. 10A, 1020 is a target image of the previous swath captured by S2 and 1010 is the reference image of the first quarter 610 of the previous swath. The vertical shift δ can be determined by aligning the reference image that is part of 610 printed by the first quarter 510 of the print head and the target image captured by the sensor S2, as described in steps 1720 and 1730. Using the equation (4), ie LF=δ+ϵ−λ, the actual linefeed distance LF can be determined using the vertical shift ϵ and the constant section size λ (in the step 1740).

Referring back to FIG. 11, after the actual linefeed distance LF is determined, its value is compared to the designed linefeed distance $D^d$ in a step 1160. The print head then compensates for the discrepancy between the actual linefeed distance LF and the designed linefeed distance $D^d$ by controlling the ejection of ink from the ink ejection nozzles within the nozzle banks. If the page is not finished (as determined by a following step 1170), the process follows a NO arrow and the print head prints the next swath (in the step 1120), which means the print head moves in the direction opposite to 240 and ejects ink from the nozzles 320 in a pattern calibrated in step 1160.

While the print head is moving across the print media in the direction opposite to 240, printing the swath consisting of 1210~1240, the sensor S1 captures an image of the current swath (step 1510).

FIG. 12A illustrates the relative positions of the print head and the printed swaths.

Figure 12B:
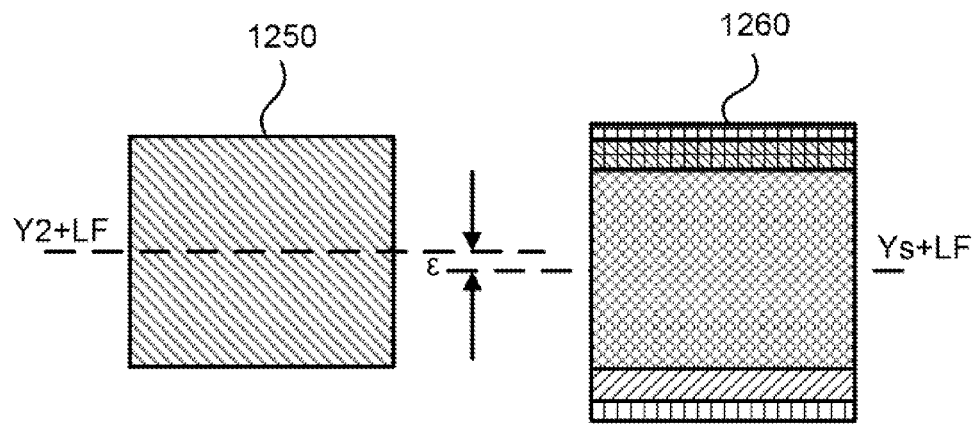

FIG. 12B shows an example of a target image 1260 captured by the sensor S1 and the corresponding reference image 1250. In FIG. 12B, 1260 refers to the current swath printed on top of the previous swath, captured by the sensor S1, and 1250 refers to the reference image of the second quarter 1220 of the current swath. By aligning the reference image 1250 and the captured target image 1260 (in a step 1520), a new value for the vertical shift ϵ can be determined (in a step 1530).

When the print head finishes printing the swath consisting of 1210~1240, the print medium advance mechanism 250 moves the print medium 230 upwards in the direction of 260 (in the step 1140). The relative positions of the print head and the previously printed swath are shown in FIG. 13A. After the linefeed step 1140, the print head prints the next swath, moving in the direction of 240 again, as shown in FIG. 13B.

Figure 18:
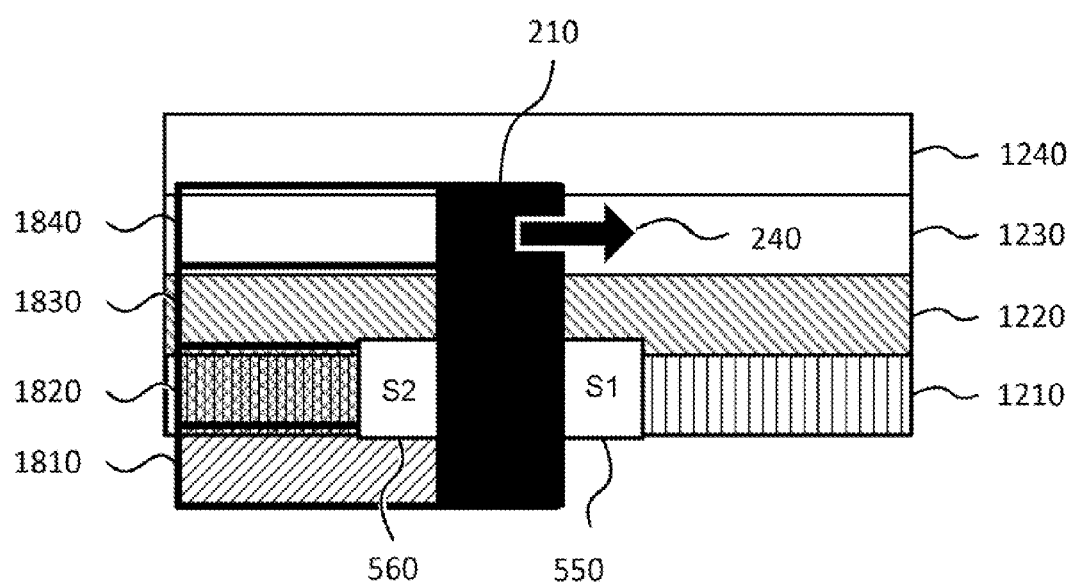
FIG. 18 illustrates the printing process of one overprint.

FIG. 18 depicts the printing process that prints the next swath in the direction of 240. In order to avoid confusion, FIG. 18 only shows two swaths, one consisting of swath parts 1210~1240 and the other consisting of swath parts 1810~1840.

Similarly, when the print head is at the position illustrated in FIG. 13B, sensor S1 captures an image of the previously printed swath (step 1710). By aligning the target image captured by S1 and its corresponding reference image (in the step 1720), a new value of the vertical shift δ is determined (in the step 1730). Using equation (4), the actual distance LF of the linefeed that occurs after the swath consisting of 1210~1240 is printed can be determined (in the step 1740). The value of λ is assumed to be known and a constant.

To calibrate the linefeed that occurs after a swath is printed in the direction of 240, the sensor S2 captures a first target image while printing this swath in order to determine the vertical shift ϵ between the second quarter of the print head 520 and the sensors, then sensor S2 captures a second image after the linefeed in order to obtain the vertical shift δ. Equation (4) is then used to determine the actual linefeed distance in the last linefeed, assuming the section size λ is a constant.

To calibrate the linefeed that happens after a swath in the direction opposite to 240, sensor S1 captures a first image while printing in order to determine the vertical shift ϵ between the second quarter of the print head 520 and the sensors, then sensor S1 captures a second image after the linefeed in order to obtain the vertical shift δ. Equation (4) is then used to determine the actual linefeed distance in the last linefeed, assuming the section size λ is a constant.

After the actual linefeed distance is determined after each linefeed and before a new swath, its value is compared to the designed linefeed distance in step 1160. The print head then compensates for the discrepancy between the actual linefeed distance and the designed linefeed distance by controlling the ejection of ink from the ink ejection nozzles within the nozzle banks.

During each swath, the sensors S1 and S2 are measuring the values of δ or ε. When the print head is moving in the direction of 240, the sensor S1 is measuring the vertical shift δ, and the sensor S2 is measuring the vertical shift ε. When the print head is moving in the direction opposite to 240, the sensor S2 is measuring the vertical shift δ, and the sensor S1 is measuring the vertical shift ε.

For each swath, the print head is printing the dot pattern calibrated using the δ measured during the current swath and ε measured during the previous swath. The value of the section size λ is assumed to be known and a constant.

The linefeed calculation (step 1150), calibration (step 1160) and printing (step 1120) process continues until the end of the page is reached.

It should be noted that the print head does not need to print in both directions. If the print head prints a swath only in the direction of 240 or only in the direction opposite to 240, only one sensor is needed. The measuring and calibration process will be essentially the same. If the print head prints a swath only in the direction of 240, only sensor S2 is needed; if the print head prints a swath only in the direction opposite to 240, only sensor S1 is needed.

It should be noted that the disclosed method to measure the vertical shift ε can be used in other applications, which rely on a sensor attached to the print head. Thus for example, thermal inkjet printers use a "service station" to maintain print quality by performing certain service operations such as head wiping on the print head. Such operations require precise location of the print head relative to the service station, and the vertical shift ε can be advantageously used in such applications. In another example, in inkjet printers the size and positions of printed dots can vary due to variations in the amount and direction of ink discharged, leading to non-uniform density in a printed image. One approach to addressing this problem involves multi-pass printing, and in this application the accurate and dynamic measurement of the vertical shift ε can contribute to improved performance.

[Third RSM Arrangement]

The third RSM arrangement is designed to measure and calibrate the linefeed distance of a printer in real time.

As described in other RSM arrangements, the printer prints a dot pattern each swath. For the purpose of real-time inkjet printer calibration, any dot pattern can be used, as described in the first and the second RSM arrangement.

Figure 19:
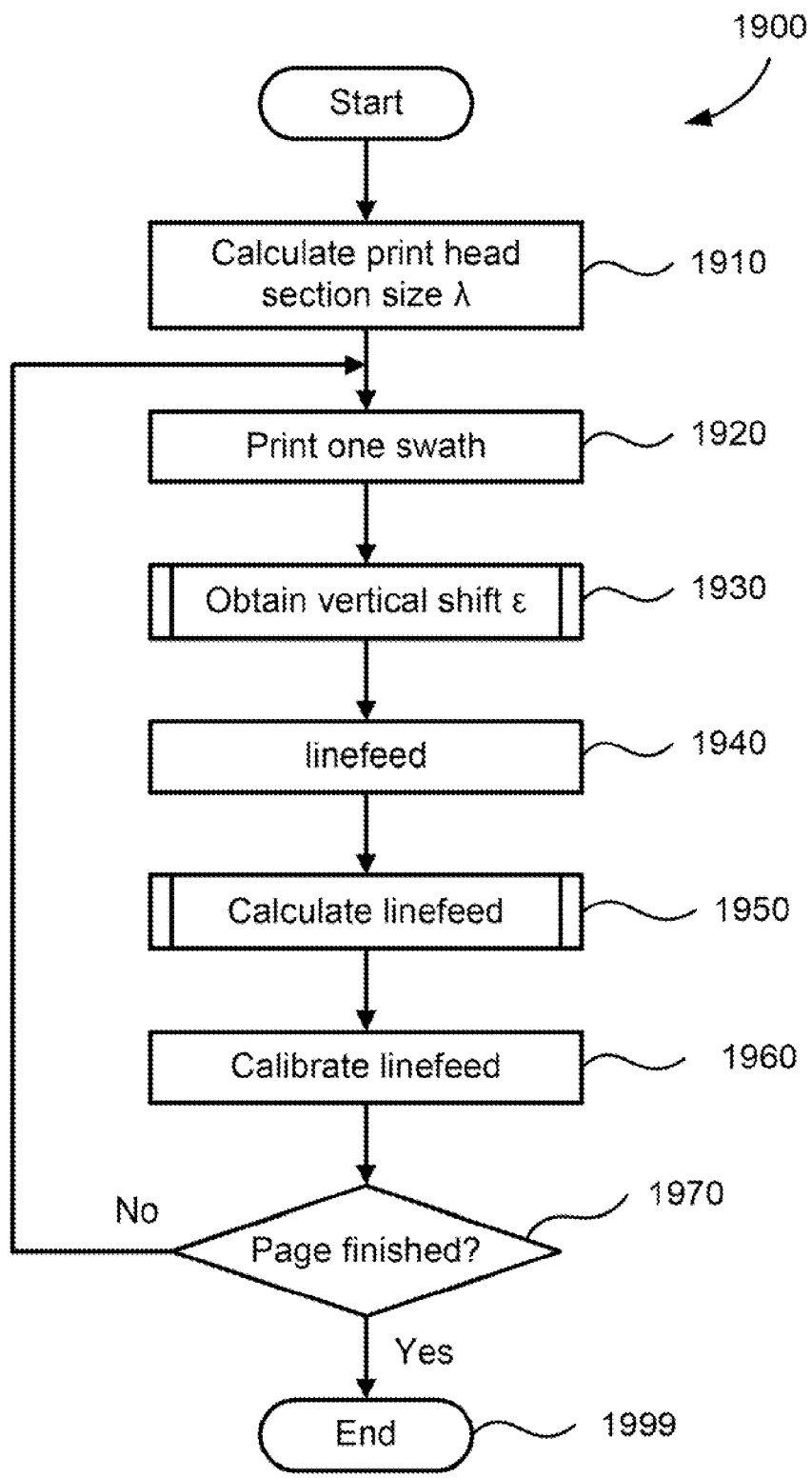
FIG. 19 shows a simplified flow diagram of the process of measuring and calibrating the exact displacement of the printer head between overprints in a third RSM arrangement.

However, if strong correlation exists between different swaths, the image alignment steps (step 920, step 1520 and step 1720) performed in the first and the second RSM arrangement will have difficulty calculating the vertical shift δ and ε accurately. Furthermore, in order to obtain reference images more accurately, it is preferable to maintain a reasonable distance between dots. In this RSM arrangement, the printing system follows the same steps as in the second RSM arrangement, as shown in FIG. 19. Nevertheless, the dot patterns printed and calibrated in step 1920 and step 1960 are specially designed to have blue noise characteristics so that the correlation between the target image and the reference image is maximized. The suitable dot pattern can be obtained by masking half-toned dot pattern with correlatable noise patterns. Alternatively, it can be obtained by applying some half-toning method like blue noise masking to some portion of density of original image.

It should be noted that accuracy can be improved further if dot patterns of first quarter of a swath and second quarter of the following swath are designed to have minimum overlap. The reason is because those 2 areas are overlapped as shown in FIG. 12B, hence minimizing interference between them is preferable.

INDUSTRIAL APPLICABILITY

The arrangements described are applicable to the computer and data processing industries and particularly for the printing and reproduction industries.

The foregoing describes only some embodiments of the present invention, and modifications and/or changes can be made thereto without departing from the scope and spirit of the invention, the embodiments being illustrative and not restrictive.

We claim:

1. A method of determining line feed error in an image forming apparatus for printing an input image by overprinting multiple times on the same area of a print medium, wherein the image forming apparatus includes a print head having ink ejection nozzles within nozzle banks and a head sensor configured to sense information from the input image printed on a print medium, the method comprising:
    obtaining swaths by half-toning the input image, wherein each swath includes a correlatable noise pattern in a bottom area of the swath and height of the bottom area is equivalent to a line feed distance;
    printing a first swath of the swaths on the print medium while the print head moves across the print medium in a scan direction;
    repositioning the print head relative to the print medium on which the first swath is printed by at least one line feed distance in a feed direction which intersects the scan direction; and
    after the repositioning, sensing the bottom of the first swath on the repositioned print medium by the head sensor and determining the line feed error based upon information sensed from the printed first swath by the head sensor, between the time when the print head reaches an edge of the printed first swath in the scan direction and the time when the ink ejection nozzles start to print a second swath of the swaths, and then printing the second while the print head moves across the print medium in the scan direction,
    wherein the line feed error is determined from a vertical shift represented by a position of the head sensor before the repositioning, the line feed distance, and a position of the printed first swath in the feed direction, and
    wherein the second swath is printed on top of the printed first swath on the print medium while compensating for the determined line feed error by controlling the ejection of ink from the ink ejection nozzles within the nozzle banks of the image forming apparatus.

2. The method according to claim 1,
    wherein determining the line feed error comprises: capturing, via the head sensor, a target image from the printed first swath, and comparing the target image to a reference image for the first swath based upon the input image, and
    wherein determining the line feed error is dependent on a relative shift between the target image and the reference image.

3. The method according to claim 2,
    wherein the head sensor is configured as two head sensors that include a front head sensor leading the print head as the print head prints a swath in a particular direction and a back head sensor trailing the print head as the print head prints the swath in the particular direction, wherein the first swath is printed in a first direction relative to the print medium and the second swath is printed in a direction opposite to the first direction, wherein determining the relative shift between the target image and the reference image is performed by the back head sensor as the print head prints the first swath, and wherein determining the line feed error is performed by the front head sensor as the print head prints the first swath.

4. The method according to claim 2, wherein determining the relative shift between the target image and the reference image comprises applying a Fourier transform to the target image and the reference image and convolving the target image and the reference image.

5. The method according to claim 1, further comprising printing, using the determined line feed error, a second swath of the input image on the print medium.

6. A method of determining line feed error in an image forming apparatus for printing an input image by overprinting multiple times on the same area of a print medium, wherein the image forming apparatus includes a print head having ink ejection nozzles within nozzle banks and two head sensors configured to sense information from the input image printed on a print medium, wherein a first one of the head sensors acts as a front head sensor while the second head sensor act as a trailing head sensor when the print head moves in a scan direction, and the first head sensor acts as the trailing head sensor while the second head sensor act as the front head sensor when the print head moves in a direction opposite to the scan direction, the method comprising:

obtaining swaths by half-toning the input image, wherein each swath includes correlatable noise pattern in the bottom area of the swath and height of the bottom area is equivalent to line feed distance;

printing a first swath of the swaths on the print medium while the print head moves across the print medium in a scan direction;

repositioning the print head relative to the print medium on which the first swath is printed by at least one line feed distance in a feed direction which intersects the scan direction; and after the repositioning, sensing the bottom of the first swath on the repositioned print medium by the preceding head sensor, determining the line feed error based upon information sensed from the printed first swath by the preceding head sensor, and then printing a second swath of the swaths while the print head moves across the print medium in the scan direction after the repositioning, wherein the line feed error is determined from a vertical shift represented by a position of the head sensor before the repositioning, the line feed distance, and a position of the printed first swath in the feed direction, based upon information sensed from the printed first swath by the head sensor when the print head reaches an edge of the printed first swath in the scan direction, and wherein the second swath is printed on top of the printed first swath on the print medium while compensating for the determined line feed error by controlling the ejection of ink from the ink ejection nozzles within the nozzle banks of the image forming apparatus.

* * * * *